US011658470B2

(12) United States Patent
Nguyen et al.

(10) Patent No.: US 11,658,470 B2
(45) Date of Patent: *May 23, 2023

(54) ELECTRICAL CABLE PASSTHROUGH

(71) Applicant: GAF Energy LLC, Parsippany, NJ (US)

(72) Inventors: Thierry Nguyen, San Francisco, CA (US); Evan Wray, Cotati, CA (US); Duncan Cleminshaw, Alameda, CA (US); Ryan Lemon Devine, Richmond, CA (US); Jonathan Hewlett, Novato, CA (US); Brian Edward Atchley, Petaluma, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,100

(22) Filed: Nov. 15, 2021

(65) Prior Publication Data

US 2022/0216680 A1 Jul. 7, 2022

Related U.S. Application Data

(63) Continuation of application No. 17/177,816, filed on Feb. 17, 2021, now Pat. No. 11,177,639.

(Continued)

(51) Int. Cl.
*H02G 3/22* (2006.01)
*H02G 15/013* (2006.01)
*H01R 13/514* (2006.01)

(52) U.S. Cl.
CPC ............ *H02G 3/22* (2013.01); *H01R 13/514* (2013.01); *H02G 15/013* (2013.01)

(58) Field of Classification Search
None
See application file for complete search history.

(56) References Cited

U.S. PATENT DOCUMENTS 1,796,269 A 8/1905 Vibber
1,294,155 A * 2/1919 Phelps .................... H02G 3/22
174/81

(Continued)

FOREIGN PATENT DOCUMENTS

CA 2112159 A1 6/1995
CA 2829440 A1 4/2014

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Timothy J. Dole
*Assistant Examiner* — Muhammed Azam
(74) *Attorney, Agent, or Firm* — Greenberg Traurig, LLP

(57) ABSTRACT

A cable passthrough includes a first layer having a first edge and an aperture, and a second layer overlapping the first layer. The passthrough is configured to be installed on a roof deck, such that the aperture is configured to align with an aperture formed within the roof deck. The passthrough is configured to receive at least one cable having a first end and a second end. The second end of the cable is capable of extending outwardly from the first edge of the first layer and the first edge of the second layer of the passthrough. The cable is configured to be positioned intermediate the first layer and the second layer.

20 Claims, 16 Drawing Sheets

Related U.S. Application Data

(60) Provisional application No. 63/024,161, filed on May 13, 2020.

(56) References Cited

U.S. PATENT DOCUMENTS

| | | | |
|---|---|---|---|
| 1,795,232 A | 3/1931 | Wilhelm | |
| 1,981,467 A | 11/1934 | Radtke | |
| 2,404,152 A * | 7/1946 | Weller | H02G 3/22 |
| | | | 174/81 |
| 2,618,683 A * | 11/1952 | Fisher | H02G 3/22 |
| | | | 174/44 |
| 2,703,688 A | 3/1955 | Shuter | |
| 2,758,152 A * | 8/1956 | Smul | H02G 3/22 |
| | | | 174/138 R |
| 2,877,031 A | 3/1959 | Charles | |
| 2,914,279 A * | 11/1959 | Bales | H02G 3/22 |
| | | | 248/49 |
| 3,156,491 A | 11/1964 | Reed et al. | |
| 3,156,497 A | 11/1964 | Lessard | |
| 3,173,734 A | 3/1965 | Hartwell | |
| 4,258,948 A | 3/1981 | Hoffmann | |
| 4,263,624 A | 4/1981 | Bejarano | |
| 4,289,288 A | 9/1981 | Gransberry et al. | |
| 4,349,220 A | 9/1982 | Carroll et al. | |
| 4,499,702 A | 2/1985 | Turner | |
| 4,548,853 A | 10/1985 | Bryan | |
| 4,603,369 A | 7/1986 | Freshman, Jr. | |
| 4,636,577 A | 1/1987 | Peterpaul | |
| 4,692,561 A | 9/1987 | Nattel | |
| 5,167,579 A | 12/1992 | Rotter | |
| 5,349,790 A | 9/1994 | Beetles et al. | |
| 5,378,166 A | 1/1995 | Gallagher, Sr. | |
| 5,442,140 A | 8/1995 | McGrane | |
| 5,562,295 A | 10/1996 | Wambeke et al. | |
| 5,590,495 A | 1/1997 | Bressler et al. | |
| 5,642,596 A | 7/1997 | Waddington | |
| 6,008,450 A | 12/1999 | Ohtsuka et al. | |
| 6,013,875 A | 1/2000 | Fridenberg et al. | |
| 6,046,399 A | 4/2000 | Kapner | |
| 6,107,574 A | 8/2000 | Chang et al. | |
| 6,320,114 B1 | 11/2001 | Kuechler | |
| 6,336,304 B1 | 1/2002 | Mimura et al. | |
| 6,341,454 B1 | 1/2002 | Koleoglou | |
| 6,361,054 B1 | 3/2002 | Denker et al. | |
| 6,407,329 B1 | 6/2002 | Iino et al. | |
| 6,576,830 B2 | 6/2003 | Nagao et al. | |
| 6,578,800 B2 | 6/2003 | Karlinger | |
| 6,753,470 B1 * | 6/2004 | Johnson | H02G 3/22 |
| | | | 174/68.3 |
| 6,858,791 B2 | 2/2005 | Erban | |
| 6,928,781 B2 | 8/2005 | Desbois et al. | |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,642,449 B2 | 1/2010 | Korman et al. | |
| 7,658,055 B1 | 2/2010 | Adriani et al. | |
| 7,666,491 B2 | 2/2010 | Yang et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Browder | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,291,658 B1 * | 10/2012 | Johnston | H02G 3/22 |
| | | | 52/220.8 |
| 8,307,590 B2 | 11/2012 | Smith | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,623,499 B2 | 1/2014 | Viasnoff | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,695,291 B2 | 4/2014 | Pisklak et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,789,321 B2 * | 7/2014 | Ishida | H01L 31/046 |
| | | | 52/173.3 |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jacobs et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,057,862 B2 | 6/2015 | Strasser et al. | |
| 9,093,582 B2 | 7/2015 | Hamilton | |
| 9,145,498 B2 | 9/2015 | Ultsch | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,171,991 B2 | 10/2015 | Pearce | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rodrigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,528,270 B2 | 12/2016 | Jenkins et al. | |
| 9,605,432 B1 | 3/2017 | Robbins | |
| 9,670,353 B2 | 6/2017 | Peng et al. | |
| 9,692,193 B1 | 6/2017 | Schnorr et al. | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,920,515 B2 | 3/2018 | Xing et al. | |
| 9,923,515 B2 | 3/2018 | Rodrigues et al. | |
| 9,938,729 B2 | 4/2018 | Coon | |
| 9,987,786 B2 | 6/2018 | Stoiljkovic et al. | |
| 9,991,412 B2 | 6/2018 | Gonzalez et al. | |
| 9,998,067 B2 | 6/2018 | Kalkanoglu et al. | |
| 10,015,933 B2 | 7/2018 | Boldrin | |
| 10,027,273 B2 | 7/2018 | West et al. | |
| 10,115,850 B2 | 10/2018 | Rodrigues et al. | |

(56) References Cited

U.S. PATENT DOCUMENTS

| | | | |
|---|---|---|---|
| 10,128,660 B1 | 11/2018 | Apte et al. | |
| 10,179,852 B2 | 1/2019 | Gossi et al. | |
| 10,187,005 B2 | 1/2019 | Rodrigues et al. | |
| 10,256,765 B2 | 4/2019 | Rodrigues et al. | |
| 10,454,408 B2 | 10/2019 | Livsey et al. | |
| 10,480,192 B2 | 11/2019 | Xing et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,601,362 B2 | 3/2020 | Stephan et al. | |
| 10,669,414 B2 | 6/2020 | Li et al. | |
| 10,784,813 B2 | 9/2020 | Kalkanoglu et al. | |
| D904,289 S | 12/2020 | Lance et al. | |
| 10,907,355 B2 | 2/2021 | Hubbard et al. | |
| 10,914,063 B2 | 2/2021 | Lee et al. | |
| RE48,555 E | 5/2021 | Cancio et al. | |
| 11,012,026 B2 | 5/2021 | Kalkanoglu et al. | |
| 11,015,085 B2 | 5/2021 | Bruns et al. | |
| 11,065,849 B2 | 7/2021 | Ackermann et al. | |
| 11,177,639 B1* | 11/2021 | Nguyen | H02G 3/22 |
| 11,217,715 B2 | 1/2022 | Sharenko et al. | |
| 11,251,744 B1 | 2/2022 | Bunea et al. | |
| 11,258,399 B2 | 2/2022 | Kalkanoglu et al. | |
| 11,283,394 B2 | 3/2022 | Perkins et al. | |
| 2002/0053360 A1 | 5/2002 | Kinoshita et al. | |
| 2002/0102422 A1 | 8/2002 | Hubbard et al. | |
| 2002/0129849 A1 | 9/2002 | Heckeroth | |
| 2003/0101662 A1 | 6/2003 | Ullman | |
| 2003/0132265 A1 | 7/2003 | Villela et al. | |
| 2003/0217768 A1 | 11/2003 | Guha | |
| 2004/0011354 A1 | 1/2004 | Erling | |
| 2005/0061360 A1 | 3/2005 | Horioka et al. | |
| 2005/0072593 A1 | 4/2005 | Teng | |
| 2005/0115603 A1 | 6/2005 | Yoshida et al. | |
| 2005/0144870 A1 | 7/2005 | Dinwoodie | |
| 2005/0178430 A1 | 8/2005 | McCaskill et al. | |
| 2006/0042683 A1 | 3/2006 | Gangemi | |
| 2006/0266406 A1 | 11/2006 | Faust et al. | |
| 2007/0087624 A1* | 4/2007 | Edwards | H02G 3/22 439/559 |
| 2007/0181174 A1 | 8/2007 | Ressler | |
| 2007/0193618 A1 | 8/2007 | Bressler et al. | |
| 2007/0254525 A1* | 11/2007 | Pyron | H02G 3/22 439/584 |
| 2008/0006323 A1 | 1/2008 | Kalkanoglu et al. | |
| 2008/0035140 A1 | 2/2008 | Placer et al. | |
| 2008/0315061 A1 | 2/2008 | Placerl. et al. | |
| 2008/0194154 A1 | 8/2008 | Minnick | |
| 2008/0271774 A1 | 11/2008 | Kalkanoglu et al. | |
| 2009/0000222 A1 | 1/2009 | Kalkanoglu et al. | |
| 2009/0019795 A1 | 1/2009 | Szacsvay et al. | |
| 2009/0044850 A1 | 2/2009 | Kimberley | |
| 2009/0057005 A1 | 3/2009 | Groeller et al. | |
| 2009/0114261 A1 | 5/2009 | Stancel et al. | |
| 2009/0126942 A1 | 5/2009 | Kimiadi | |
| 2009/0133340 A1 | 5/2009 | Shiao et al. | |
| 2009/0159118 A1 | 6/2009 | Kalkanoglu | |
| 2009/0178350 A1 | 7/2009 | Kalkanoglu et al. | |
| 2009/0229652 A1 | 9/2009 | Mapel et al. | |
| 2010/0101634 A1 | 4/2010 | Frank et al. | |
| 2010/0139184 A1 | 6/2010 | Williams et al. | |
| 2010/0146878 A1 | 6/2010 | Koch et al. | |
| 2010/0159221 A1 | 6/2010 | Kourtakis et al. | |
| 2010/0181088 A1 | 7/2010 | Stolt et al. | |
| 2010/0270967 A1 | 10/2010 | Cho et al. | |
| 2010/0313499 A1 | 12/2010 | Gangemi | |
| 2010/0326488 A1 | 12/2010 | Aue et al. | |
| 2010/0326501 A1 | 12/2010 | Zhao et al. | |
| 2011/0030761 A1 | 2/2011 | Kalkanoglu et al. | |
| 2011/0036386 A1 | 2/2011 | Browder | |
| 2011/0036389 A1 | 2/2011 | Hardikar et al. | |
| 2011/0048507 A1 | 3/2011 | Livsey et al. | |
| 2011/0058337 A1 | 3/2011 | Han | |
| 2011/0061326 A1 | 3/2011 | Jenkins | |
| 2011/0100436 A1 | 5/2011 | Cleereman et al. | |
| 2011/0104488 A1 | 5/2011 | Muessig et al. | |
| 2011/0132427 A1 | 6/2011 | Kalkanoglu et al. | |
| 2011/0194277 A1 | 8/2011 | Yamaguchi | |
| 2011/0239555 A1 | 10/2011 | Cook et al. | |
| 2011/0297442 A1 | 12/2011 | Sulzer | |
| 2011/0302859 A1 | 12/2011 | Crasnianski | |
| 2012/0060902 A1 | 3/2012 | Drake | |
| 2012/0137600 A1 | 6/2012 | Jenkins | |
| 2012/0176077 A1 | 7/2012 | Oh et al. | |
| 2012/0212065 A1 | 8/2012 | Cheng et al. | |
| 2012/0233940 A1 | 9/2012 | Perkins | |
| 2012/0240490 A1 | 9/2012 | Gangemi | |
| 2012/0260977 A1 | 10/2012 | Cel | |
| 2012/0266942 A1 | 10/2012 | Komatsu et al. | |
| 2012/0279150 A1 | 11/2012 | Pisklak et al. | |
| 2012/0325548 A1 | 12/2012 | Martinson et al. | |
| 2013/0008499 A1 | 1/2013 | Verger et al. | |
| 2013/0014455 A1 | 1/2013 | Grieco | |
| 2013/0177458 A1 | 7/2013 | Ying et al. | |
| 2013/0193769 A1 | 8/2013 | Mehta et al. | |
| 2013/0206939 A1 | 8/2013 | Kuhn | |
| 2013/0247988 A1 | 9/2013 | Reese et al. | |
| 2013/0284267 A1 | 10/2013 | Plug et al. | |
| 2013/0306137 A1 | 11/2013 | Ko | |
| 2014/0090697 A1 | 4/2014 | Rodrigues et al. | |
| 2014/0150843 A1 | 6/2014 | Pearce et al. | |
| 2014/0173997 A1 | 6/2014 | Jenkins | |
| 2014/0179220 A1 | 6/2014 | Railkar et al. | |
| 2014/0182928 A1 | 7/2014 | Starke et al. | |
| 2014/0254776 A1 | 9/2014 | O'Connor et al. | |
| 2014/0259974 A1 | 9/2014 | Gilleran | |
| 2014/0284098 A1 | 9/2014 | Yamanaka et al. | |
| 2014/0311556 A1 | 10/2014 | Feng et al. | |
| 2014/0352760 A1 | 12/2014 | Haynes et al. | |
| 2014/0366464 A1 | 12/2014 | Rodrigues et al. | |
| 2015/0023822 A1 | 1/2015 | Majors et al. | |
| 2015/0024159 A1 | 1/2015 | Bess et al. | |
| 2015/0040965 A1 | 2/2015 | West et al. | |
| 2015/0089895 A1 | 4/2015 | Leitch | |
| 2015/0152980 A1 | 6/2015 | Okura | |
| 2015/0155079 A1 | 6/2015 | Martins | |
| 2015/0155823 A1 | 6/2015 | West et al. | |
| 2015/0244158 A1 | 8/2015 | Fukuoka et al. | |
| 2015/0318680 A1 | 11/2015 | Solak et al. | |
| 2015/0340516 A1 | 11/2015 | Kim et al. | |
| 2015/0349173 A1 | 12/2015 | Morad et al. | |
| 2016/0040809 A1 | 2/2016 | Berlter et al. | |
| 2016/0105144 A1 | 4/2016 | Haynes et al. | |
| 2016/0141846 A1 | 5/2016 | Atchley et al. | |
| 2016/0248368 A1 | 8/2016 | Seery et al. | |
| 2016/0254776 A1 | 9/2016 | Rodrigues et al. | |
| 2016/0268790 A1 | 9/2016 | Panfil et al. | |
| 2016/0276508 A1 | 9/2016 | Huang et al. | |
| 2016/0308489 A1 | 10/2016 | Hudson et al. | |
| 2016/0359451 A1 | 12/2016 | Mao et al. | |
| 2017/0085072 A1* | 3/2017 | Sherman | H02G 1/00 |
| 2017/0159292 A1 | 6/2017 | Chihlas et al. | |
| 2017/0179726 A1 | 6/2017 | Garrity et al. | |
| 2017/0203555 A1 | 7/2017 | Wang et al. | |
| 2017/0317433 A1 | 11/2017 | Merrill et al. | |
| 2017/0331415 A1 | 11/2017 | Koppi et al. | |
| 2018/0094438 A1 | 4/2018 | Wu et al. | |
| 2018/0094439 A1 | 4/2018 | Wang et al. | |
| 2018/0097472 A1 | 4/2018 | Anderson et al. | |
| 2018/0116062 A1 | 4/2018 | Maeshiba | |
| 2018/0128400 A1 | 5/2018 | Twelves et al. | |
| 2018/0163900 A1 | 6/2018 | Vaughn et al. | |
| 2018/0191290 A1 | 7/2018 | Guthrie et al. | |
| 2018/0248306 A1 | 8/2018 | Franke et al. | |
| 2018/0281347 A1 | 10/2018 | Gossi | |
| 2018/0351502 A1 | 12/2018 | Almy et al. | |
| 2019/0030867 A1 | 1/2019 | Sun et al. | |
| 2019/0081436 A1 | 3/2019 | Onodi et al. | |
| 2019/0115743 A1 | 4/2019 | Portillo Gallego | |
| 2019/0123540 A1 | 4/2019 | Nakamura | |
| 2019/0140430 A1 | 5/2019 | Waltkus et al. | |
| 2019/0257051 A1 | 8/2019 | Dallinger | |
| 2019/0305717 A1 | 10/2019 | Allen et al. | |

(56) References Cited

U.S. PATENT DOCUMENTS

| | | |
|---|---|---|
| 2019/0360612 A1 | 11/2019 | DeCosta |
| 2019/0372517 A1 | 12/2019 | Pao |
| 2019/0393690 A1 | 12/2019 | Coscarella |
| 2020/0020819 A1 | 1/2020 | Farhangi |
| 2020/0052472 A1 | 2/2020 | Goto et al. |
| 2020/0083634 A1 | 3/2020 | Ito |
| 2020/0109320 A1 | 4/2020 | Jiang |
| 2020/0115907 A1 | 4/2020 | Agam |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0002898 A1 | 1/2021 | Knebel et al. |
| 2021/0095474 A1 | 4/2021 | Yang et al. |
| 2021/0113970 A1 | 4/2021 | Stainer et al. |
| 2021/0115223 A1 | 4/2021 | Bonekamp et al. |
| 2021/0159353 A1 | 5/2021 | Li et al. |
| 2021/0171808 A1 | 6/2021 | Ackermann et al. |
| 2021/0172174 A1 | 6/2021 | Ackermann et al. |

FOREIGN PATENT DOCUMENTS

| | | | | |
|---|---|---|---|---|
| CA | 3080473 A1 | * | 12/2020 | ........... H02G 3/0633 |
| CH | 700095 A2 | | 6/2010 | |
| CN | 202797032 U | | 3/2013 | |
| CN | 111769494 A | * | 10/2020 | ......... B60R 16/0215 |
| DE | 1958248 A1 | | 11/1971 | |
| DE | 2732093 A1 | * | 1/1979 | |
| DE | 3440512 A1 | | 4/1986 | |
| DE | 3546221 A1 | * | 7/1987 | |
| DE | 3732486 A1 | | 4/1989 | |
| DE | 29509193 U1 | | 8/1995 | |
| DE | 20018651 U1 | * | 12/2000 | ......... E04D 13/1475 |
| DE | 10342082 A1 | | 4/2005 | |
| DE | 102005057870 B3 | | 5/2007 | |
| DE | 102015114289 A1 | | 3/2017 | |
| DE | 202016105271 U1 | | 12/2017 | |
| DK | 163548 B | * | 3/1992 | |
| EP | 0018654 A1 | * | 12/1980 | |
| EP | 0475417 B2 | * | 9/1991 | |
| EP | 1837162 A1 | | 9/2007 | |
| EP | 2003757 A1 | | 12/2008 | |
| EP | 1774372 A1 | | 7/2011 | |
| EP | 2456290 A1 | * | 5/2012 | ........... F02B 63/044 |
| EP | 2784241 A1 | | 10/2014 | |
| EP | 2868345 A1 | | 5/2015 | |
| EP | 3208507 B1 | | 5/2020 | |
| EP | 3719945 A1 | | 10/2020 | |
| ES | 2329005 T3 | * | 11/2009 | ............... H02G 3/22 |
| FR | 2569500 A1 | * | 9/1986 | |
| FR | 2877779 A1 | | 5/2006 | |
| FR | 2977395 A1 | | 1/2013 | |
| FR | 2977395 A1 | * | 1/2013 | ....... H01L 31/02008 |
| FR | 3085238 A1 | | 2/2020 | |
| GB | 338332 A | | 11/1930 | |
| IT | 1095019 B | * | 8/1985 | ........... E04B 1/0023 |
| JP | 2001-098703 A | | 4/2001 | |
| JP | 2014220076 A | | 11/2014 | |
| JP | 2014220870 A | * | 11/2014 | |
| JP | 2017-027735 A | | 2/2017 | |
| JP | 2018-053707 A | | 4/2018 | |
| KR | 850003633 A | * | 6/1985 | |
| KR | 100948166 B1 | * | 3/2010 | |
| KR | 20140142286 A | * | 12/2014 | |
| WO | 2008153485 A1 | | 12/2008 | |
| WO | 2011/049944 A1 | | 4/2011 | |
| WO | 2011121829 A1 | | 10/2011 | |
| WO | WO-2012136306 A1 | * | 10/2012 | ........... H01Q 1/1214 |
| WO | 2013094355 A1 | | 6/2013 | |
| WO | 2014126821 A1 | | 8/2014 | |
| WO | 2015/133632 A1 | | 9/2015 | |
| WO | 2016006017 A1 | | 1/2016 | |
| WO | WO-2018207167 A1 | * | 11/2018 | ............. E04D 13/14 |
| WO | 2019/201416 A1 | | 10/2019 | |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing <<https://www.owenscorning.com/en-us/roofing/tools/how-roofing-underlayment-helps-protect-your-home>> retrieved Nov. 1, 2021.

* cited by examiner

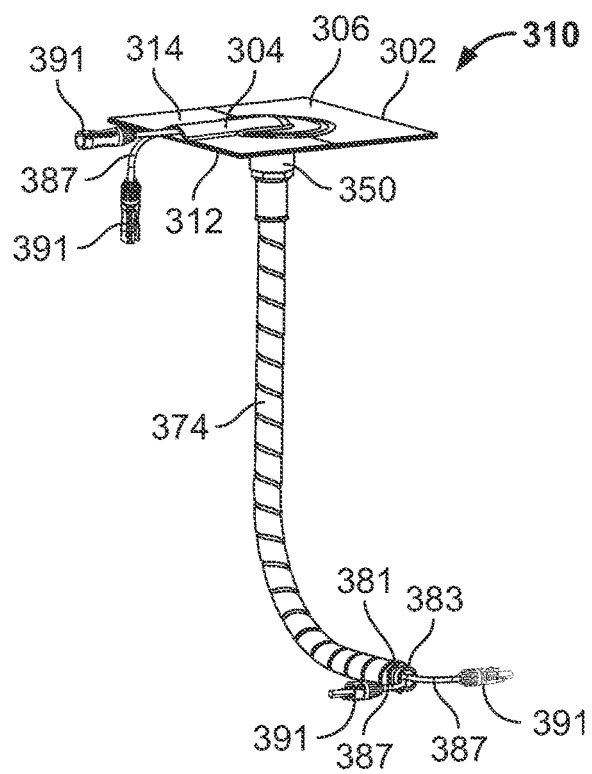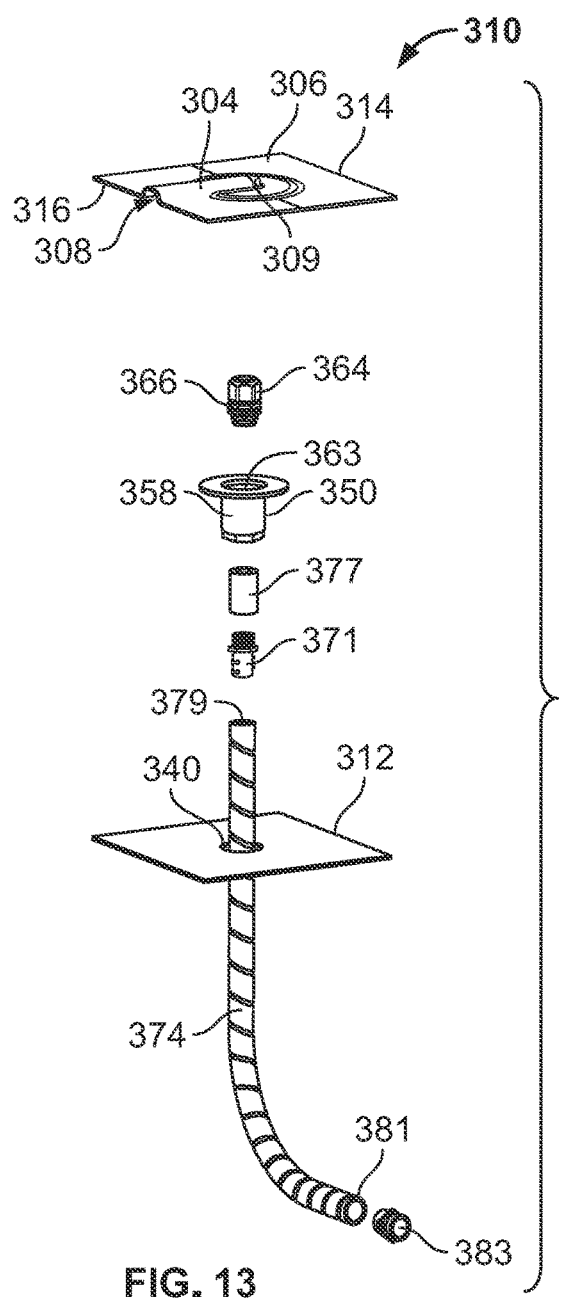
FIG. 12
FIG. 13

ELECTRICAL CABLE PASSTHROUGH

CROSS-REFERENCE TO RELATED APPLICATIONS

This application is a continuation application relating to and claiming the benefit of commonly-owned, co-pending U.S. Nonprovisional application Ser. No. 17/177,816, filed Feb. 17, 2021, which claims the benefit of commonly-owned U.S. Provisional Patent Application Ser. No. 63/024,161, filed May 13, 2020, entitled "ELECTRICAL CABLE PASS-THROUGH," the contents of each of which is incorporated herein by reference in its entirety.

FIELD OF THE INVENTION

The present invention relates to passthrough devices and, more particularly, passthrough devices for electrical cables.

BACKGROUND OF THE INVENTION

Photovoltaic systems having solar panels are commonly installed on roofing of structures. What is needed is an efficient electrical cable passthrough configured for use with photovoltaic systems installed on roof decks.

SUMMARY OF THE INVENTION

In an embodiment, a system includes a passthrough including a first layer having a first edge and an aperture, and a second layer overlapping the first layer, the second layer including a first edge substantially aligned with the first edge of the first layer, wherein the passthrough is configured to be installed on a roof deck, and wherein the aperture is configured to align with an aperture formed within the roof deck; and at least one cable having a first end and a second end opposite the first end, wherein the aperture of the first layer of the passthrough is sized and shaped to receive the first end of the at least one cable, wherein the second end of the at least one cable extends outwardly from the first edge of the first layer and the first edge of the second layer of the passthrough, and wherein the second end of the at least one cable is positioned intermediate the first layer and the second layer of the passthrough.

In an embodiment, the first layer includes a second edge opposite the first edge of the first layer, and the second layer includes a second edge opposite the first edge of the second layer, and wherein the second layer is attached to the first layer intermediate the first edge of the first layer and the second edge of the first layer. In an embodiment, the first layer includes a third edge extending between the first edge of the first layer and the second edge of the first layer, and the second layer includes a third edge extending between the first edge of the second layer and the second edge of the second layer, and wherein the second layer is attached to the first layer proximate to the third edge of the first layer. In an embodiment, the first layer includes a fourth edge extending between the first edge of the first layer and the second edge of the first layer, and the second layer includes a fourth edge extending between the first edge of the second layer and the second edge of the second layer, and wherein the second layer is attached to the first layer proximate to the fourth edge of the first layer.

In an embodiment, the passthrough includes a pocket having a perimeter defined by an area of attachment of the second layer to the first layer. In an embodiment, each of the first layer and the second layer of the passthrough is made from a polymer. In an embodiment, each of the first layer and the second layer of the passthrough includes thermoplastic polyolefin (TPO). In an embodiment, the passthrough is affixed to the roof deck by a plurality of fasteners.

In an embodiment, the first layer of the passthrough is affixed to the roof deck by a plurality of fasteners, and wherein the plurality of fasteners is located intermediate a perimeter of the pocket and the first, second, third and fourth edges of the first layer. In an embodiment, the passthrough is affixed to the roof deck by an adhesive. In an embodiment, the passthrough includes a base plate having a base with first surface and a second surface opposite the first surface, and a tubular member extending from the second surface, and wherein the tubular member is sized and shaped to be positioned through the aperture of the passthrough and the aperture of the roof deck.

In an embodiment, the base of the base plate is configured to be positioned substantially flush with the roof deck. In an embodiment, a thickness of the base of the base plate is in a range of 0.5 mm to 5 mm. In an embodiment, the system further includes a cable gland installed within the tubular member of the base plate. In an embodiment, the cable gland includes a body having a first end and a second end opposite the first end of the body of the cable gland, and a sealing nut located at the first end of the body, wherein the sealing nut is sized and shaped to be positioned within the tubular member of the base plate.

In an embodiment, the system further includes a raceway attached to the second end of the body of the cable gland. In an embodiment, the passthrough is configured to receive the least one cable having a bend with a bend radius in a range of 10 mm to 20 mm. In an embodiment, the cable gland includes a socket wherein the socket includes a first surface, a second surface opposite the first surface of the socket, at least one first receptacle within the first surface of the socket, and at least one second receptacle within the second surface of the socket and in communication with a corresponding one of the at least one first receptacle, wherein the at least one first receptacle is configured to receive a connector of the at least one cable, and the at least one second receptacle is configured to receive a connector of at least one of a second cable. In an embodiment, the at least one cable includes a flat wire, and at least one of a second cable includes a round wire.

In an embodiment, the cable passthrough includes a first layer having a first edge and an aperture; a second layer overlapping the first layer, the second layer including a first edge substantially aligned with the first edge of the first layer, wherein the passthrough is configured to be installed on a roof deck, and wherein the aperture is configured to align with an aperture formed within the roof deck, wherein the passthrough is configured to receive at least one cable having a first end and a second end opposite the first end, wherein the aperture of the first layer of the passthrough is sized and shaped to receive the first end of the at least one cable, wherein the second end of the at least one cable is capable of extending outwardly from the first edge of the first layer and the first edge of the second layer of the passthrough, and wherein the second end of the at least one cable is configured to be positioned intermediate the first layer and the second layer of the passthrough.

BRIEF DESCRIPTION OF THE DRAWINGS

FIGS. 12 and 13 show a perspective view and an exploded perspective view, respectively, of an embodiment of an electrical cable passthrough;

DETAILED DESCRIPTION

Figure 1:
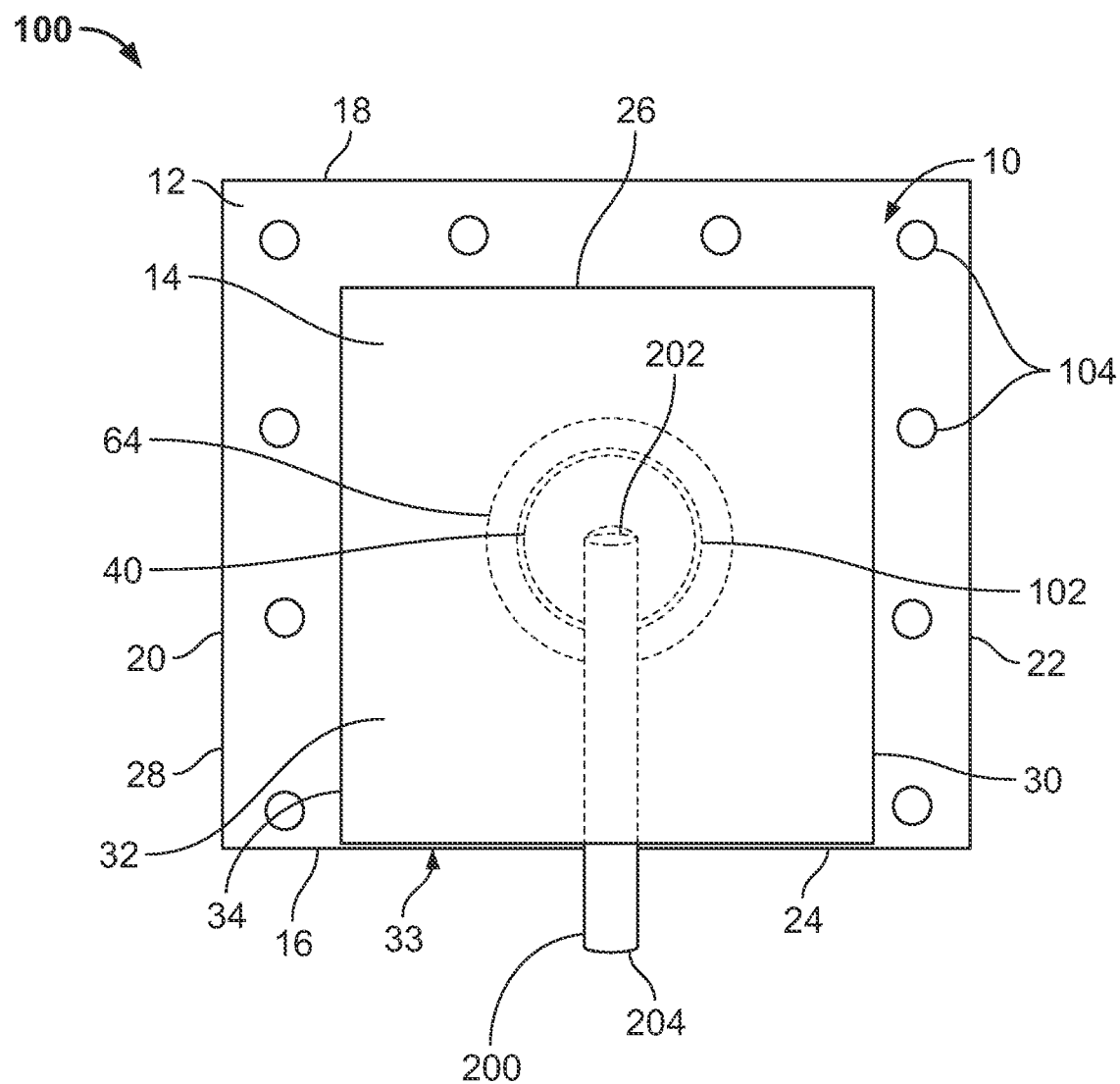
FIG. 1 is a schematic top plan view of an embodiment of an electrical cable passthrough.
Figure 2A:
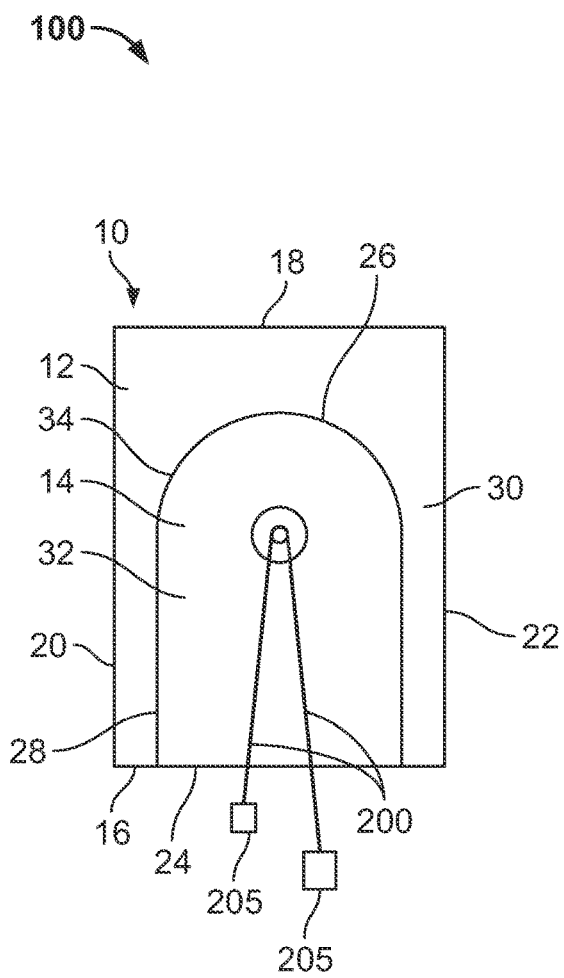
FIGS. 2A and 2B are schematic views of the electrical cable passthrough of FIG. 1.
Figure 2B:
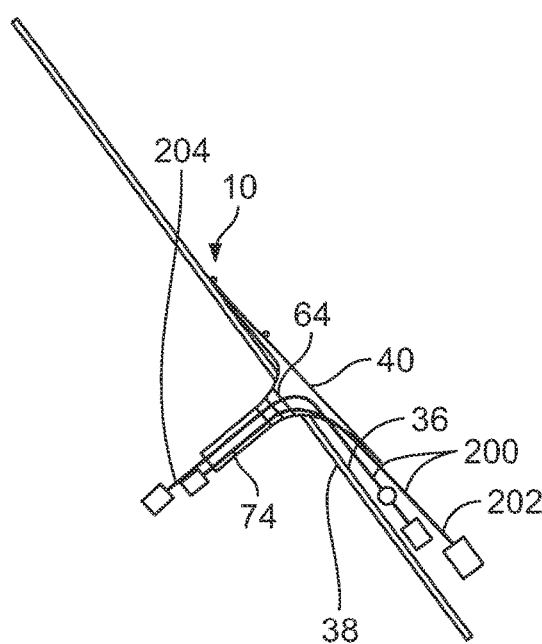
Figure 3:
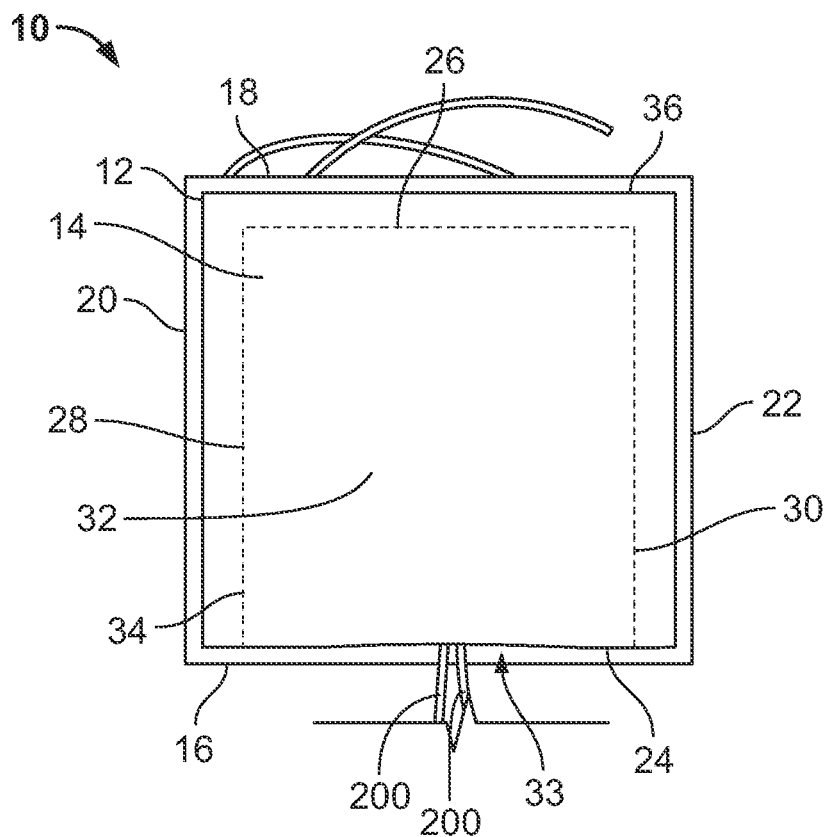
FIG. 3 is a photo of top plan view of the electrical cable passthrough of FIG. 1.
Figure 4:
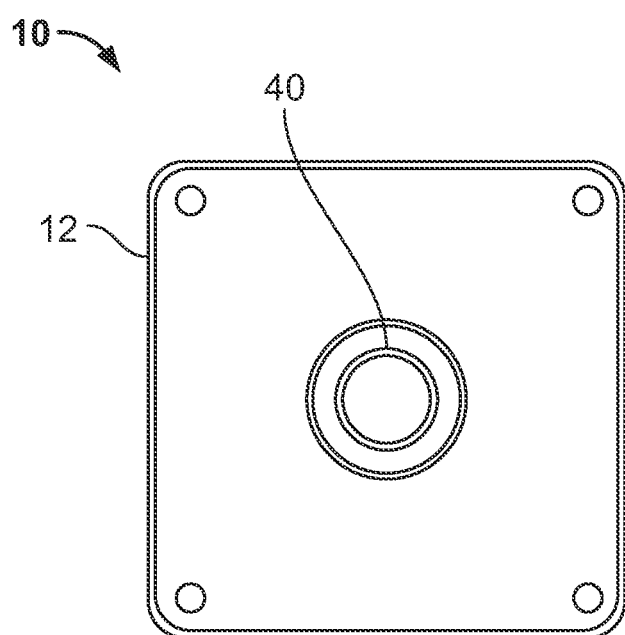
FIG. 4 is a photo of a bottom plan view of the electrical cable passthrough shown in FIG. 3.
Figure 5:
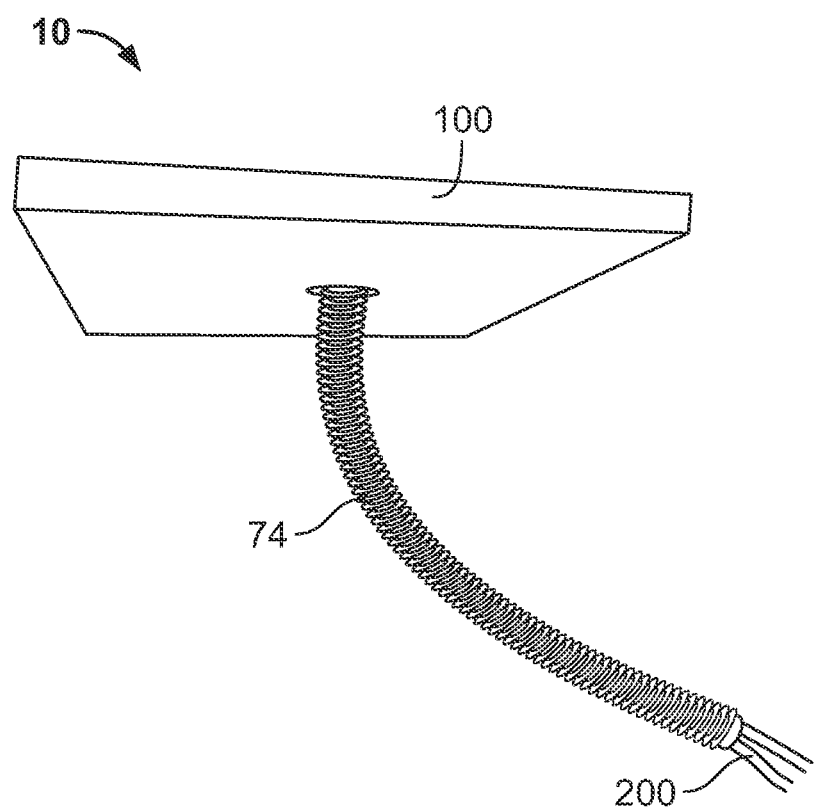
FIG. 5 is a photo of a bottom perspective view of the electrical cable passthrough shown in FIG. 4 with a raceway connected to the passthrough.
Figure 6:
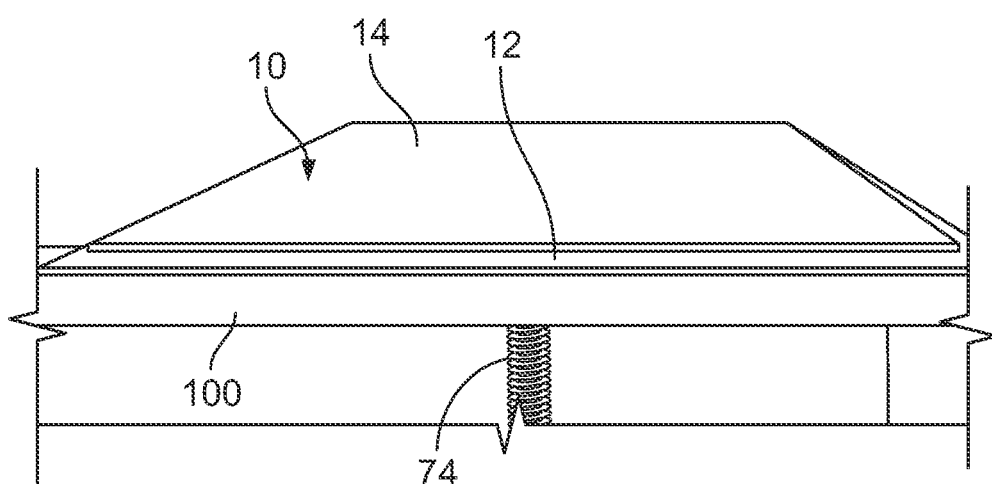
FIG. 6 is a photo of a side elevational view of the electrical cable passthrough shown in FIG. 5.

Referring to FIGS. 1 through 6, in an embodiment, an electrical cable passthrough 10 (hereinafter "passthrough 10") includes a first layer 12 and a second layer 14. In an embodiment, the second layer 14 overlaps the first layer 12. In an embodiment, the first layer 12 includes a first edge 16, a second edge 18 opposite the first edge 16, a third edge 20 extending between the first edge 16 and the second edge 18, and a fourth edge 22 extending between the first edge 16 and the second edge 18 and opposite the third edge 20. In an embodiment, the second layer 14 includes a first edge 24, a second edge 26 opposite the first edge 24, a third edge 28 extending between the first edge 24 and the second edge 26, and a fourth edge 30 extending between the first edge 24 and the second edge 26 and opposite the third edge 28. In an embodiment, each or any of the first, second, third and fourth edges 16, 18, 20, 22 of the first layer 12 includes a linear edge. In an embodiment, each or any of the first, second, third and fourth edges 24, 26, 28, 30 of the second layer 14 includes a linear edge. In another embodiment, each or any of the first, second, third, and fourth edges 16, 18, 20, 22 of the first layer 12 includes a curvilinear edge. In another embodiment, each or any of the first, second, third and fourth edges 24, 26, 28, 30 of the second layer 14 includes a curvilinear edge. In an embodiment, each or either of the first and second layers 12, 14 is square in shape. In another embodiment, each or either of the first and second layers 12, 14 is rectangular in shape.

In an embodiment, the first edge 24 of the second layer 14 is substantially aligned with the first edge 16 of the first layer 12. In another embodiment, the first edge 24 of the second layer 14 is aligned with the first edge 16 of the first layer 12. In an embodiment, the second layer 14 is attached to the first layer 12 intermediate the first edge 16 of the first layer 12 and the second edge 18 of the first layer 12. In an embodiment, the second layer 14 is attached to the first layer 12 proximate to the second edge 18 of the first layer 12. In an embodiment, the second layer 14 is attached to the first layer 12 proximate to the third edge 20 of the first layer 12. In an embodiment, the second layer 14 is attached to the first layer 12 proximate to the fourth edge 22 of the first layer 12. In an embodiment, the passthrough 10 includes a pocket 32 having a perimeter 34 defined by an area of attachment of the second layer 14 to the first layer 12. In an embodiment, the pocket 32 includes an opening 33 formed by the first edge 16 of the first layer 12 and the second edge 26 of the second layer 14. In an embodiment, the first layer 12 includes a first surface 36, a second surface 38 opposite the first surface 36, and an aperture 40 extending from the first surface 36 to the second surface 38.

In an embodiment, the first layer 12 is made from a polymer. In an embodiment, the second layer 14 is made from a polymer. In an embodiment, the first layer 12 includes thermoplastic polyolefin (TPO). In an embodiment, the second layer 14 includes thermoplastic polyolefin (TPO). In other embodiments, the first layer 12 and the second layer 14 are made of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide.

In another embodiment, the first layer 12 and the second layer 14 are made from polyvinyl chloride (PVC). In another embodiment, the first layer 12 and the second layer 14 are made from ethylene propylene diene monomer (EPDM) rubber. In another embodiment, the first layer 12 and the second layer 14 are made from silicone rubber. In another embodiment, the first layer 12 and the second layer 14 are made from a fluoropolymer. In certain embodiments, the fluoropolymer may be ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In another embodiment, the first layer 12 is made of metal. In an embodiment, the second layer 14 is made of metal. In an embodiment, the first layer 12 and the second layer 14 are made from aluminum. In another embodiment, the first layer 12 and the second layer 14 are made from weldable aluminum.

In an embodiment, a flexibility of each of the first layer 12 and the second layer 14 conforms to standards under ASTM D6878-17, Section 7.9 test standards. In an embodiment, each of the first and second layers 12, 14 includes a hardness in a range of Shore 70A to Shore 100A. In another embodiment, each of the first and second layers 12, 14 includes a hardness in a range of Shore 70A to Shore 95A. In another embodiment, each of the first and second layers 12, 14 includes a hardness in a range of Shore 70A to Shore 90A. In another embodiment, each of the first and second layers 12, 14 includes a hardness in a range of Shore 70A to Shore 85A. In another embodiment, each of the first and second layers 12, 14 includes a hardness in a range of Shore 70A to Shore 80A. In another embodiment, each of the first and second layers 12, 14 includes a hardness in a range of Shore 70A to Shore 75A. In another embodiment, each of the first and second layers 12, 14 includes a hardness in a range of Shore 75A to Shore 100A. In another embodiment, each of the first and second layers 12, 14 includes a hardness in a range of Shore 80A to Shore 100A. In another embodiment, each of the first and second layers 12, 14 includes a hardness in a range of Shore 85A to Shore 100A. In another embodiment, each of the first and second layers 12, 14 includes a hardness in a range of Shore 90A to Shore 100A. In another embodiment, each of the first and second layers 12, 14 includes a hardness in a range of Shore 95A to Shore 100A.

In another embodiment, each of the first and second layers 12, 14 includes a hardness in a range of Shore 75A to Shore 95A. In another embodiment, each of the first and second layers 12, 14 includes a hardness in a range of Shore 75A to Shore 90A. In another embodiment, each of the first and second layers 12, 14 includes a hardness in a range of Shore 75A to Shore 85A. In another embodiment, each of the first and second layers 12, 14 includes a hardness in a range of Shore 75A to Shore 80A. In another embodiment, each of the first and second layers 12, 14 includes a hardness in a range of Shore 80A to Shore 95A. In another embodiment, each of the first and second layers 12, 14 includes a hardness in a range of Shore 80A to Shore 90A. In another embodiment, each of the first and second layers 12, 14 includes a hardness in a range of Shore 80A to Shore 85A. In another embodiment, each of the first and second layers 12, 14 includes a hardness in a range of Shore 85A to Shore 95A. In another embodiment, each of the first and second layers 12, 14 includes a hardness in a range of Shore 85A to Shore 90A. In another embodiment, each of the first and second layers 12, 14 includes a hardness in a range of Shore 90A to Shore 95A.

In an embodiment, each of the first layer 12 and the second layer 14 includes a thickness in a range of 5 mil to 100 mil. In another embodiment, each of the first layer 12 and the second layer 14 includes a thickness in a range of 5 mil to 95 mil. In another embodiment, each of the first layer 12 and the second layer 14 includes a thickness in a range of 5 mil to 90 mil. In another embodiment, each of the first layer 12 and the second layer 14 includes a thickness in a range of 5 mil to 85 mil. In another embodiment, each of the first layer 12 and the second layer 14 includes a thickness in a range of 5 mil to 80 mil. In another embodiment, each of the first layer 12 and the second layer 14 includes a thickness in a range of 5 mil to 75 mil. In another embodiment, each of the first layer 12 and the second layer 14 includes a thickness in a range of 5 mil to 70 mil. In another embodiment, each of the first layer 12 and the second layer 14 includes a thickness in a range of 5 mil to 65 mil. In another embodiment, each of the first layer 12 and the second layer 14 includes a thickness in a range of 5 mil to 60 mil. In another embodiment, each of the first layer 12 and the second layer 14 includes a thickness in a range of 5 mil to 55 mil. In another embodiment, each of the first layer 12 and the second layer 14 includes a thickness in a range of 5 mil to 50 mil. In another embodiment, each of the first layer 12 and the second layer 14 includes a thickness in a range of 5 mil to 45 mil. In another embodiment, each of the first layer 12 and the second layer 14 includes a thickness in a range of 5 mil to 40 mil. In another embodiment, each of the first layer 12 and the second layer 14 includes a thickness in a range of 5 mil to 35 mil. In another embodiment, each of the first layer 12 and the second layer 14 includes a thickness in a range of 5 mil to 30 mil. In another embodiment, each of the first layer 12 and the second layer 14 includes a thickness in a range of 5 mil to 25 mil. In another embodiment, each of the first layer 12 and the second layer 14 includes a thickness in a range of 5 mil to 20 mil. In another embodiment, each of the first layer 12 and the second layer 14 includes a thickness in a range of 5 mil to 15 mil. In another embodiment, each of the first layer 12 and the second layer 14 includes a thickness in a range of 5 mil to 10 mil.

In another embodiment, each of the first layer 12 and the second layer 14 includes a thickness in a range of 10 mil to 100 mil. In another embodiment, each of the first layer 12 and the second layer 14 includes a thickness in a range of 15 mil to 100 mil. In another embodiment, each of the first layer 12 and the second layer 14 includes a thickness in a range of 20 mil to 100 mil. In another embodiment, each of the first layer 12 and the second layer 14 includes a thickness in a range of 25 mil to 100 mil. In another embodiment, each of the first layer 12 and the second layer 14 includes a thickness in a range of 30 mil to 100 mil. In another embodiment, each of the first layer 12 and the second layer 14 includes a thickness in a range of 35 mil to 100 mil. In another embodiment, each of the first layer 12 and the second layer 14 includes a thickness in a range of 40 mil to 100 mil. In another embodiment, each of the first layer 12 and the second layer 14 includes a thickness in a range of 45 mil to 100 mil. In another embodiment, each of the first layer 12 and the second layer 14 includes a thickness in a range of 50 mil to 100 mil. In another embodiment, each of the first layer 12 and the second layer 14 includes a thickness in a range of 55 mil to 100 mil. In another embodiment, each of the first layer 12 and the second layer 14 includes a thickness in a range of 60 mil to 100 mil. In another embodiment, each of the first layer 12 and the second layer 14 includes a thickness in a range of 65 mil to 100 mil. In another embodiment, each of the first layer 12 and the second layer 14 includes a thickness in a range of 70 mil to 100 mil. In another embodiment, each of the first layer 12 and the second layer 14 includes a thickness in a range of 75 mil to 100 mil. In another embodiment, each of the first layer 12 and the second layer 14 includes a thickness in a range of 80 mil to 100 mil. In another embodiment, each of the first layer 12 and the second layer 14 includes a thickness in a range of 85 mil to 100 mil. In another embodiment, each of the first layer 12 and the second layer 14 includes a thickness in a range of 90 mil to 100 mil. In another embodiment, each of the first layer 12 and the second layer 14 includes a thickness in a range of 95 mil to 100 mil.

In another embodiment, each of the first layer 12 and the second layer 14 includes a thickness in a range of 10 mil to 95 mil. In another embodiment, each of the first layer 12 and the second layer 14 includes a thickness in a range of 15 mil to 95 mil. In another embodiment, each of the first layer 12 and the second layer 14 includes a thickness in a range of 20 mil to 95 mil. In another embodiment, each of the first layer 12 and the second layer 14 includes a thickness in a range of 25 mil to 95 mil. In another embodiment, each of the first layer 12 and the second layer 14 includes a thickness in a range of 30 mil to 95 mil. In another embodiment, each of the first layer 12 and the second layer 14 includes a thickness in a range of 35 mil to 95 mil. In another embodiment, each of the first layer 12 and the second layer 14 includes a thickness in a range of 40 mil to 95 mil. In another embodiment, each of the first layer 12 and the second layer 14 includes a thickness in a range of 45 mil to 95 mil. In another embodiment, each of the first layer 12 and the second layer 14 includes a thickness in a range of 50 mil to 95 mil. In another embodiment, each of the first layer 12 and the second layer 14 includes a thickness in a range of 55 mil to 95 mil. In another embodiment, each of the first layer 12 and the second layer 14 includes a thickness in a range of 60 mil to 95 mil. In another embodiment, each of the first layer 12 and the second layer 14 includes a thickness in a range of 65 mil to 95 mil. In another embodiment, each of the first layer 12 and the second layer 14 includes a thickness in a range of 70 mil to 95 mil. In another embodiment, each of the first layer 12 and the second layer 14 includes a thickness in a range of 75 mil to 95 mil. In another embodiment, each of the first layer 12 and the second layer 14 includes a thickness in a range of 80 mil to 95 mil. In another embodiment, each of the first layer 12 and the second layer 14 includes a thickness in a range of 85 mil to 95 mil. In another embodiment, each of the first layer 12 and the second layer 14 includes a thickness in a range of 90 mil to 95 mil.

In another embodiment, each of the first layer 12 and the second layer 14 includes a thickness in a range of 15 mil to 90 mil. In another embodiment, each of the first layer 12 and the second layer 14 includes a thickness in a range of 20 mil to 90 mil. In another embodiment, each of the first layer 12 and the second layer 14 includes a thickness in a range of 25 mil to 90 mil. In another embodiment, each of the first layer 12 and the second layer 14 includes a thickness in a range of 30 mil to 90 mil. In another embodiment, each of the first layer 12 and the second layer 14 includes a thickness in a range of 35 mil to 90 mil. In another embodiment, each of the first layer 12 and the second layer 14 includes a thickness in a range of 40 mil to 90 mil. In another embodiment, each of the first layer 12 and the second layer 14 includes a thickness in a range of 45 mil to 90 mil. In another embodiment, each of the first layer 12 and the second layer 14 includes a thickness in a range of 50 mil to 90 mil. In another embodiment, each of the first layer 12 and the second layer 14 includes a thickness in a range of 55 mil to 90 mil. In another embodiment, each of the first layer 12 and the second layer 14 includes a thickness in a range of 60 mil to 90 mil. In another embodiment, each of the first layer 12 and the second layer 14 includes a thickness in a range of 65 mil to 90 mil. In another embodiment, each of the first layer 12 and the second layer 14 includes a thickness in a range of 70 mil to 90 mil. In another embodiment, each of the first layer 12 and the second layer 14 includes a thickness in a range of 75 mil to 90 mil. In another embodiment, each of the first layer 12 and the second layer 14 includes a thickness in a range of 80 mil to 90 mil. In another embodiment, each of the first layer 12 and the second layer 14 includes a thickness in a range of 85 mil to 90 mil.

In another embodiment, each of the first layer 12 and the second layer 14 includes a thickness in a range of 15 mil to 85 mil. In another embodiment, each of the first layer 12 and the second layer 14 includes a thickness in a range of 20 mil to 85 mil. In another embodiment, each of the first layer 12 and the second layer 14 includes a thickness in a range of 25 mil to 85 mil. In another embodiment, each of the first layer 12 and the second layer 14 includes a thickness in a range of 30 mil to 85 mil. In another embodiment, each of the first layer 12 and the second layer 14 includes a thickness in a range of 35 mil to 85 mil. In another embodiment, each of the first layer 12 and the second layer 14 includes a thickness in a range of 40 mil to 85 mil. In another embodiment, each of the first layer 12 and the second layer 14 includes a thickness in a range of 45 mil to 85 mil. In another embodiment, each of the first layer 12 and the second layer 14 includes a thickness in a range of 50 mil to 85 mil. In another embodiment, each of the first layer 12 and the second layer 14 includes a thickness in a range of 55 mil to 85 mil. In another embodiment, each of the first layer 12 and the second layer 14 includes a thickness in a range of 60 mil to 85 mil. In another embodiment, each of the first layer 12 and the second layer 14 includes a thickness in a range of 65 mil to 85 mil. In another embodiment, each of the first layer 12 and the second layer 14 includes a thickness in a range of 70 mil to 85 mil. In another embodiment, each of the first layer 12 and the second layer 14 includes a thickness in a range of 75 mil to 85 mil. In another embodiment, each of the first layer 12 and the second layer 14 includes a thickness in a range of 80 mil to 85 mil.

In another embodiment, each of the first layer 12 and the second layer 14 includes a thickness in a range of 20 mil to 80 mil. In another embodiment, each of the first layer 12 and the second layer 14 includes a thickness in a range of 25 mil to 80 mil. In another embodiment, each of the first layer 12 and the second layer 14 includes a thickness in a range of 30 mil to 80 mil. In another embodiment, each of the first layer 12 and the second layer 14 includes a thickness in a range of 35 mil to 80 mil. In another embodiment, each of the first layer 12 and the second layer 14 includes a thickness in a range of 40 mil to 80 mil. In another embodiment, each of the first layer 12 and the second layer 14 includes a thickness in a range of 45 mil to 80 mil. In another embodiment, each of the first layer 12 and the second layer 14 includes a thickness in a range of 50 mil to 80 mil. In another embodiment, each of the first layer 12 and the second layer 14 includes a thickness in a range of 55 mil to 80 mil. In another embodiment, each of the first layer 12 and the second layer 14 includes a thickness in a range of 60 mil to 80 mil. In another embodiment, each of the first layer 12 and the second layer 14 includes a thickness in a range of 65 mil to 80 mil. In another embodiment, each of the first layer 12 and the second layer 14 includes a thickness in a range of 70 mil to 80 mil. In another embodiment, each of the first layer 12 and the second layer 14 includes a thickness in a range of 75 mil to 80 mil.

In another embodiment, each of the first layer 12 and the second layer 14 includes a thickness in a range of 25 mil to 75 mil. In another embodiment, each of the first layer 12 and the second layer 14 includes a thickness in a range of 30 mil to 75 mil. In another embodiment, each of the first layer 12 and the second layer 14 includes a thickness in a range of 35 mil to 75 mil. In another embodiment, each of the first layer 12 and the second layer 14 includes a thickness in a range of 40 mil to 75 mil. In another embodiment, each of the first layer 12 and the second layer 14 includes a thickness in a range of 45 mil to 75 mil. In another embodiment, each of the first layer 12 and the second layer 14 includes a thickness in a range of 50 mil to 75 mil. In another embodiment, each of the first layer 12 and the second layer 14 includes a thickness in a range of 55 mil to 75 mil. In another embodiment, each of the first layer 12 and the second layer 14 includes a thickness in a range of 60 mil to 75 mil. In another embodiment, each of the first layer 12 and the second layer 14 includes a thickness in a range of 65 mil to 75 mil. In another embodiment, each of the first layer 12 and the second layer 14 includes a thickness in a range of 70 mil to 75 mil.

In another embodiment, each of the first layer 12 and the second layer 14 includes a thickness in a range of 30 mil to 70 mil. In another embodiment, each of the first layer 12 and the second layer 14 includes a thickness in a range of 35 mil to 70 mil. In another embodiment, each of the first layer 12 and the second layer 14 includes a thickness in a range of 40 mil to 70 mil. In another embodiment, each of the first layer 12 and the second layer 14 includes a thickness in a range of 45 mil to 70 mil. In another embodiment, each of the first layer 12 and the second layer 14 includes a thickness in a range of 50 mil to 70 mil. In another embodiment, each of the first layer 12 and the second layer 14 includes a thickness in a range of 55 mil to 70 mil. In another embodiment, each of the first layer 12 and the second layer 14 includes a thickness in a range of 60 mil to 70 mil. In another embodiment, each of the first layer 12 and the second layer 14 includes a thickness in a range of 65 mil to 70 mil.

In another embodiment, each of the first layer 12 and the second layer 14 includes a thickness in a range of 35 mil to 65 mil. In another embodiment, each of the first layer 12 and the second layer 14 includes a thickness in a range of 40 mil to 65 mil. In another embodiment, each of the first layer 12 and the second layer 14 includes a thickness in a range of 45 mil to 65 mil. In another embodiment, each of the first layer 12 and the second layer 14 includes a thickness in a range of 50 mil to 65 mil. In another embodiment, each of the first layer 12 and the second layer 14 includes a thickness in a range of 55 mil to 65 mil. In another embodiment, each of the first layer 12 and the second layer 14 includes a thickness in a range of 60 mil to 65 mil.

In another embodiment, each of the first layer 12 and the second layer 14 includes a thickness in a range of 40 mil to 60 mil. In another embodiment, each of the first layer 12 and the second layer 14 includes a thickness in a range of 45 mil to 60 mil. In another embodiment, each of the first layer 12 and the second layer 14 includes a thickness in a range of 50 mil to 60 mil. In another embodiment, each of the first layer 12 and the second layer 14 includes a thickness in a range of 55 mil to 60 mil. In another embodiment, each of the first layer 12 and the second layer 14 includes a thickness in a range of 45 mil to 55 mil. In another embodiment, each of the first layer 12 and the second layer 14 includes a thickness in a range of 50 mil to 55 mil. In another embodiment, each of the first layer 12 and the second layer 14 includes a thickness in a range of 45 mil to 50 mil.

In an embodiment, an impact resistance of the passthrough 10 is characterized by a Class 4 rating in accordance with the standards of ANSI FM 4473 test standards.

Referring to FIGS. 1 through 6, in an embodiment, the passthrough 10 is configured to be installed on a roof deck 100. In an embodiment, the roof deck 100 includes a sloped roof deck. In another embodiment, the roof deck 100 includes a substantially flat roof deck. In an embodiment, the aperture 40 of the first layer 12 of the passthrough 10 is configured to align with an aperture 102 formed within the roof deck 100. In an embodiment, the passthrough 10 is configured to be affixed to the roof deck 100 by a plurality of fasteners 104. In an embodiment, the plurality of fasteners 104 is located intermediate the perimeter 34 of the pocket 32 and the first, second, third and fourth edges 16, 18, 20, 22 of the first layer 12.

In an embodiment, each of the plurality of fasteners 104 is spaced apart from an adjacent one of the fasteners 104 by a distance in a range from 1 inch to 10 inches. In another embodiment, each of the plurality of fasteners 104 is spaced apart from an adjacent one of the fasteners 104 by a distance in a range from 2 inches to 10 inches. In another embodiment, each of the plurality of fasteners 104 is spaced apart from an adjacent one of the fasteners 104 by a distance in a range from 3 inches to 10 inches. In another embodiment, each of the plurality of fasteners 104 is spaced apart from an adjacent one of the fasteners 104 by a distance in a range from 4 inches to 10 inches. In another embodiment, each of the plurality of fasteners 104 is spaced apart from an adjacent one of the fasteners 104 by a distance in a range from 5 inches to 10 inches. In another embodiment, each of the plurality of fasteners 104 is spaced apart from an adjacent one of the fasteners 104 by a distance in a range from 6 inches to 10 inches. In another embodiment, each of the plurality of fasteners 104 is spaced apart from an adjacent one of the fasteners 104 by a distance in a range from 7 inches to 10 inches. In another embodiment, each of the plurality of fasteners 104 is spaced apart from an adjacent one of the fasteners 104 by a distance in a range from 8 inches to 10 inches. In another embodiment, each of the plurality of fasteners 104 is spaced apart from an adjacent one of the fasteners 104 by a distance in a range from 9 inches to 10 inches.

In another embodiment, each of the plurality of fasteners 104 is spaced apart from an adjacent one of the fasteners 104 by a distance in a range from 1 inch to 9 inches. In another embodiment, each of the plurality of fasteners 104 is spaced apart from an adjacent one of the fasteners 104 by a distance in a range from 2 inches to 9 inches. In another embodiment, each of the plurality of fasteners 104 is spaced apart from an adjacent one of the fasteners 104 by a distance in a range from 3 inches to 9 inches. In another embodiment, each of the plurality of fasteners 104 is spaced apart from an adjacent one of the fasteners 104 by a distance in a range from 4 inches to 9 inches. In another embodiment, each of the plurality of fasteners 104 is spaced apart from an adjacent one of the fasteners 104 by a distance in a range from 5 inches to 9 inches. In another embodiment, each of the plurality of fasteners 104 is spaced apart from an adjacent one of the fasteners 104 by a distance in a range from 6 inches to 9 inches. In another embodiment, each of the plurality of fasteners 104 is spaced apart from an adjacent one of the fasteners 104 by a distance in a range from 7 inches to 9 inches. In another embodiment, each of the plurality of fasteners 104 is spaced apart from an adjacent one of the fasteners 104 by a distance in a range from 8 inches to 9 inches.

In another embodiment, each of the plurality of fasteners 104 is spaced apart from an adjacent one of the fasteners 104 by a distance in a range from 1 inch to 8 inches. In another embodiment, each of the plurality of fasteners 104 is spaced apart from an adjacent one of the fasteners 104 by a distance in a range from 2 inches to 8 inches. In another embodiment, each of the plurality of fasteners 104 is spaced apart from an adjacent one of the fasteners 104 by a distance in a range from 3 inches to 8 inches. In another embodiment, each of the plurality of fasteners 104 is spaced apart from an adjacent one of the fasteners 104 by a distance in a range from 4 inches to 8 inches. In another embodiment, each of the plurality of fasteners 104 is spaced apart from an adjacent one of the fasteners 104 by a distance in a range from 5 inches to 8 inches. In another embodiment, each of the plurality of fasteners 104 is spaced apart from an adjacent one of the fasteners 104 by a distance in a range from 6 inches to 8 inches. In another embodiment, each of the plurality of fasteners 104 is spaced apart from an adjacent one of the fasteners 104 by a distance in a range from 7 inches to 8 inches.

In another embodiment, each of the plurality of fasteners 104 is spaced apart from an adjacent one of the fasteners 104 by a distance in a range from 1 inch to 7 inches. In another embodiment, each of the plurality of fasteners 104 is spaced apart from an adjacent one of the fasteners 104 by a distance in a range from 2 inches to 7 inches. In another embodiment, each of the plurality of fasteners 104 is spaced apart from an adjacent one of the fasteners 104 by a distance in a range from 3 inches to 7 inches. In another embodiment, each of the plurality of fasteners 104 is spaced apart from an adjacent one of the fasteners 104 by a distance in a range from 4 inches to 7 inches. In another embodiment, each of the plurality of fasteners 104 is spaced apart from an adjacent one of the fasteners 104 by a distance in a range from 5 inches to 7 inches. In another embodiment, each of the plurality of fasteners 104 is spaced apart from an adjacent one of the fasteners 104 by a distance in a range from 6 inches to 7 inches.

In another embodiment, each of the plurality of fasteners 104 is spaced apart from an adjacent one of the fasteners 104 by a distance in a range from 1 inch to 6 inches. In another embodiment, each of the plurality of fasteners 104 is spaced apart from an adjacent one of the fasteners 104 by a distance in a range from 2 inches to 6 inches. In another embodiment, each of the plurality of fasteners 104 is spaced apart from an adjacent one of the fasteners 104 by a distance in a range from 3 inches to 6 inches. In another embodiment, each of the plurality of fasteners 104 is spaced apart from an adjacent one of the fasteners 104 by a distance in a range from 4 inches to 6 inches. In another embodiment, each of the plurality of fasteners 104 is spaced apart from an adjacent one of the fasteners 104 by a distance in a range from 5 inches to 6 inches.

In another embodiment, each of the plurality of fasteners 104 is spaced apart from an adjacent one of the fasteners 104 by a distance in a range from 1 inch to 5 inches. In another embodiment, each of the plurality of fasteners 104 is spaced apart from an adjacent one of the fasteners 104 by a distance in a range from 2 inches to 5 inches. In another embodiment, each of the plurality of fasteners 104 is spaced apart from an adjacent one of the fasteners 104 by a distance in a range from 3 inches to 5 inches. In another embodiment, each of the plurality of fasteners 104 is spaced apart from an adjacent one of the fasteners 104 by a distance in a range from 4 inches to 5 inches.

In another embodiment, each of the plurality of fasteners 104 is spaced apart from an adjacent one of the fasteners 104 by a distance in a range from 1 inch to 4 inches. In another embodiment, each of the plurality of fasteners 104 is spaced apart from an adjacent one of the fasteners 104 by a distance in a range from 2 inches to 4 inches. In another embodiment, each of the plurality of fasteners 104 is spaced apart from an adjacent one of the fasteners 104 by a distance in a range from 3 inches to 4 inches.

In another embodiment, each of the plurality of fasteners 104 is spaced apart from an adjacent one of the fasteners 104 by a distance in a range from 1 inch to 3 inches. In another embodiment, each of the plurality of fasteners 104 is spaced apart from an adjacent one of the fasteners 104 by a distance in a range from 2 inches to 3 inches. In another embodiment, each of the plurality of fasteners 104 is spaced apart from an adjacent one of the fasteners 104 by a distance in a range from 1 inch to 2 inches.

In another embodiment, each of the plurality of fasteners 104 is spaced apart from an adjacent one of the fasteners 104 by 1 inch. In another embodiment, each of the plurality of fasteners 104 is spaced apart from an adjacent one of the fasteners 104 by 2 inches. In another embodiment, each of the plurality of fasteners 104 is spaced apart from an adjacent one of the fasteners 104 by 3 inches. In another embodiment, each of the plurality of fasteners 104 is spaced apart from an adjacent one of the fasteners 104 by 4 inches. In another embodiment, each of the plurality of fasteners 104 is spaced apart from an adjacent one of the fasteners 104 by 5 inches. In another embodiment, each of the plurality of fasteners 104 is spaced apart from an adjacent one of the fasteners 104 by 6 inches. In another embodiment, each of the plurality of fasteners 104 is spaced apart from an adjacent one of the fasteners 104 by 7 inches. In another embodiment, each of the plurality of fasteners 104 is spaced apart from an adjacent one of the fasteners 104 by 8 inches. In another embodiment, each of the plurality of fasteners 104 is spaced apart from an adjacent one of the fasteners 104 by 9 inches. In another embodiment, each of the plurality of fasteners 104 is spaced apart from an adjacent one of the fasteners 104 by 10 inches.

In an embodiment, the plurality of fasteners 104 includes a plurality of nails. In another embodiment, the plurality of fasteners 104 includes a plurality of screws. In another embodiment, the plurality of fasteners 104 includes a plurality of staples. In another embodiment, the plurality of fasteners 104 includes a plurality of rivets.

In another embodiment, the passthrough 10 is configured to be affixed to the roof deck 100 by an adhesive. In an embodiment, the first layer 12 is affixed to the roof deck 100 by the adhesive. In an embodiment, at least one watershedding layer is configured to overlap the passthrough 10 when installed on the roof deck 100. In an embodiment, the at least one watershedding layer includes a plurality of watershedding layers. In another embodiment, at least one shingle is configured to overlap the passthrough 10 when installed on the roof deck 100. In an embodiment, the at least one shingle includes a plurality of shingles. In another embodiment, flashing may be installed around and adjacent to the passthrough 10.

In an embodiment, the passthrough 10 is configured to receive at least one cable 200 having a first end 202 and a second end 204 opposite the first end 202. In an embodiment, the aperture 40 of the first layer 12 of the passthrough 10 is sized and shaped to receive the first end 202 of the at least one cable 200. In an embodiment, the second end 204 of the at least one cable 200 is configured to extend through the opening 33 and outwardly from the first edge 16 of the first layer 12 and the first edge 24 of the second layer 14. In an embodiment, the opening 33 is sealed by a sealant. In an embodiment, the sealant includes butyl, silicone, rubber, epoxy, latex, neoprene, or polyurethane foam. In an embodiment, the second end 204 of the at least one cable 200 is configured to be positioned intermediate the first layer 12 and the second layer 14. In an embodiment, each of the first and second ends 202, 204 of the at least one cable 200 includes an electrical connector 205. In an embodiment, the connector 205 of the second end 204 of the at least one cable 200 is configured to be electrically connected to a photovoltaic junction box. In an embodiment, the at least one cable 200 includes a plurality of the cables 200.

In an embodiment, the passthrough 10 includes a thickness in a range of 1 mm to 15 mm. In another embodiment, the passthrough 10 includes a thickness in a range of 2 mm to 15 mm. In another embodiment, the passthrough 10 includes a thickness in a range of 3 mm to 15 mm. In another embodiment, the passthrough 10 includes a thickness in a range of 4 mm to 15 mm. In another embodiment, the passthrough 10 includes a thickness in a range of 5 mm to 15 mm. In another embodiment, the passthrough 10 includes a thickness in a range of 6 mm to 15 mm. In another embodiment, the passthrough 10 includes a thickness in a range of 7 mm to 15 mm. In another embodiment, the passthrough 10 includes a thickness in a range of 8 mm to 15 mm. In another embodiment, the passthrough 10 includes a thickness in a range of 9 mm to 15 mm. In another embodiment, the passthrough 10 includes a thickness in a range of 10 mm to 15 mm. In another embodiment, the passthrough 10 includes a thickness in a range of 11 mm to 15 mm. In another embodiment, the passthrough 10 includes a thickness in a range of 12 mm to 15 mm. In another embodiment, the passthrough 10 includes a thickness in a range of 13 mm to 15 mm. In another embodiment, the passthrough 10 includes a thickness in a range of 14 mm to 15 mm.

In another embodiment, the passthrough 10 includes a thickness in a range of 1 mm to 14 mm. In another embodiment, the passthrough 10 includes a thickness in a range of 2 mm to 14 mm. In another embodiment, the passthrough 10 includes a thickness in a range of 3 mm to 14 mm. In another embodiment, the passthrough 10 includes a thickness in a range of 4 mm to 14 mm. In another embodiment, the passthrough 10 includes a thickness in a range of 5 mm to 14 mm. In another embodiment, the passthrough 10 includes a thickness in a range of 6 mm to 14 mm. In another embodiment, the passthrough 10 includes a thickness in a range of 7 mm to 14 mm. In another embodiment, the passthrough 10 includes a thickness in a range of 8 mm to 14 mm. In another embodiment, the passthrough 10 includes a thickness in a range of 9 mm to 14 mm. In another embodiment, the passthrough 10 includes a thickness in a range of 10 mm to 14 mm. In another embodiment, the passthrough 10 includes a thickness in a range of 11 mm to 14 mm. In another embodiment, the passthrough 10 includes a thickness in a range of 12 mm to 14 mm. In another embodiment, the passthrough 10 includes a thickness in a range of 13 mm to 14 mm.

In another embodiment, the passthrough 10 includes a thickness in a range of 1 mm to 13 mm. In another embodiment, the passthrough 10 includes a thickness in a range of 2 mm to 13 mm. In another embodiment, the passthrough 10 includes a thickness in a range of 3 mm to 13 mm. In another embodiment, the passthrough 10 includes a thickness in a range of 4 mm to 13 mm. In another embodiment, the passthrough 10 includes a thickness in a range of 5 mm to 13 mm. In another embodiment, the passthrough 10 includes a thickness in a range of 6 mm to 13 mm. In another embodiment, the passthrough 10 includes a thickness in a range of 7 mm to 13 mm. In another embodiment, the passthrough 10 includes a thickness in a range of 8 mm to 13 mm. In another embodiment, the passthrough 10 includes a thickness in a range of 9 mm to 13 mm. In another embodiment, the passthrough 10 includes a thickness in a range of 10 mm to 13 mm. In another embodiment, the passthrough 10 includes a thickness in a range of 11 mm to 13 mm. In another embodiment, the passthrough 10 includes a thickness in a range of 12 mm to 13 mm.

In another embodiment, the passthrough 10 includes a thickness in a range of 1 mm to 12 mm. In another embodiment, the passthrough 10 includes a thickness in a range of 2 mm to 12 mm. In another embodiment, the passthrough 10 includes a thickness in a range of 3 mm to 12 mm. In another embodiment, the passthrough 10 includes a thickness in a range of 4 mm to 12 mm. In another embodiment, the passthrough 10 includes a thickness in a range of 5 mm to 12 mm. In another embodiment, the passthrough 10 includes a thickness in a range of 6 mm to 12 mm. In another embodiment, the passthrough 10 includes a thickness in a range of 7 mm to 12 mm. In another embodiment, the passthrough 10 includes a thickness in a range of 8 mm to 12 mm. In another embodiment, the passthrough 10 includes a thickness in a range of 9 mm to 12 mm. In another embodiment, the passthrough 10 includes a thickness in a range of 10 mm to 12 mm. In another embodiment, the passthrough 10 includes a thickness in a range of 11 mm to 12 mm.

In another embodiment, the passthrough 10 includes a thickness in a range of 1 mm to 11 mm. In another embodiment, the passthrough 10 includes a thickness in a range of 2 mm to 11 mm. In another embodiment, the passthrough 10 includes a thickness in a range of 3 mm to 11 mm. In another embodiment, the passthrough 10 includes a thickness in a range of 4 mm to 11 mm. In another embodiment, the passthrough 10 includes a thickness in a range of 5 mm to 11 mm. In another embodiment, the passthrough 10 includes a thickness in a range of 6 mm to 11 mm. In another embodiment, the passthrough 10 includes a thickness in a range of 7 mm to 11 mm. In another embodiment, the passthrough 10 includes a thickness in a range of 8 mm to 11 mm. In another embodiment, the passthrough 10 includes a thickness in a range of 9 mm to 11 mm. In another embodiment, the passthrough 10 includes a thickness in a range of 10 mm to 11 mm.

In another embodiment, the passthrough 10 includes a thickness in a range of 1 mm to 10 mm. In another embodiment, the passthrough 10 includes a thickness in a range of 2 mm to 10 mm. In another embodiment, the passthrough 10 includes a thickness in a range of 3 mm to 10 mm. In another embodiment, the passthrough 10 includes a thickness in a range of 4 mm to 10 mm. In another embodiment, the passthrough 10 includes a thickness in a range of 5 mm to 10 mm. In another embodiment, the passthrough 10 includes a thickness in a range of 6 mm to 10 mm. In another embodiment, the passthrough 10 includes a thickness in a range of 7 mm to 10 mm. In another embodiment, the passthrough 10 includes a thickness in a range of 8 mm to 10 mm. In another embodiment, the passthrough 10 includes a thickness in a range of 9 mm to 10 mm.

In another embodiment, the passthrough 10 includes a thickness in a range of 1 mm to 9 mm. In another embodiment, the passthrough 10 includes a thickness in a range of 2 mm to 9 mm. In another embodiment, the passthrough 10 includes a thickness in a range of 3 mm to 9 mm. In another embodiment, the passthrough 10 includes a thickness in a range of 4 mm to 9 mm. In another embodiment, the passthrough 10 includes a thickness in a range of 5 mm to 9 mm. In another embodiment, the passthrough 10 includes a thickness in a range of 6 mm to 9 mm. In another embodiment, the passthrough 10 includes a thickness in a range of 7 mm to 9 mm. In another embodiment, the passthrough 10 includes a thickness in a range of 8 mm to 9 mm.

In another embodiment, the passthrough 10 includes a thickness in a range of 1 mm to 8 mm. In another embodiment, the passthrough 10 includes a thickness in a range of 2 mm to 8 mm. In another embodiment, the passthrough 10 includes a thickness in a range of 3 mm to 8 mm. In another embodiment, the passthrough 10 includes a thickness in a range of 4 mm to 8 mm. In another embodiment, the passthrough 10 includes a thickness in a range of 5 mm to 8 mm. In another embodiment, the passthrough 10 includes a thickness in a range of 6 mm to 8 mm. In another embodiment, the passthrough 10 includes a thickness in a range of 7 mm to 8 mm.

In another embodiment, the passthrough 10 includes a thickness in a range of 1 mm to 7 mm. In another embodiment, the passthrough 10 includes a thickness in a range of 2 mm to 7 mm. In another embodiment, the passthrough 10 includes a thickness in a range of 3 mm to 7 mm. In another embodiment, the passthrough 10 includes a thickness in a range of 4 mm to 7 mm. In another embodiment, the passthrough 10 includes a thickness in a range of 5 mm to 7 mm. In another embodiment, the passthrough 10 includes a thickness in a range of 6 mm to 7 mm.

In another embodiment, the passthrough 10 includes a thickness in a range of 1 mm to 6 mm. In another embodiment, the passthrough 10 includes a thickness in a range of 2 mm to 6 mm. In another embodiment, the passthrough 10 includes a thickness in a range of 3 mm to 6 mm. In another embodiment, the passthrough 10 includes a thickness in a range of 4 mm to 6 mm. In another embodiment, the passthrough 10 includes a thickness in a range of 5 mm to 6 mm.

In another embodiment, the passthrough 10 includes a thickness in a range of 1 mm to 5 mm. In another embodiment, the passthrough 10 includes a thickness in a range of 2 mm to 5 mm. In another embodiment, the passthrough 10 includes a thickness in a range of 3 mm to 5 mm. In another embodiment, the passthrough 10 includes a thickness in a range of 4 mm to 5 mm.

In another embodiment, the passthrough 10 includes a thickness in a range of 1 mm to 4 mm. In another embodiment, the passthrough 10 includes a thickness in a range of 2 mm to 4 mm. In another embodiment, the passthrough 10 includes a thickness in a range of 3 mm to 4 mm.

In another embodiment, the passthrough 10 includes a thickness in a range of 1 mm to 3 mm. In another embodiment, the passthrough 10 includes a thickness in a range of 2 mm to 3 mm. In another embodiment, the passthrough 10 includes a thickness in a range of 1 mm to 2 mm.

Figure 7:
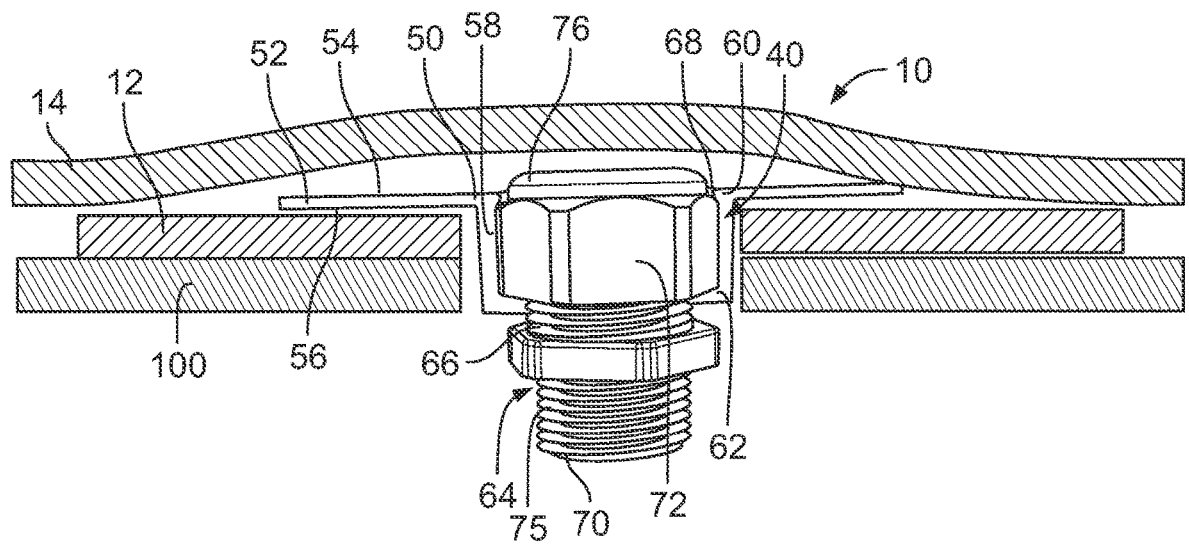
FIG. 7 is a photo of a side elevational, partially cross-sectional view of an embodiment of an electrical cable passthrough showing a base plate and a sealing gland employed by the passthrough.
Figure 8:
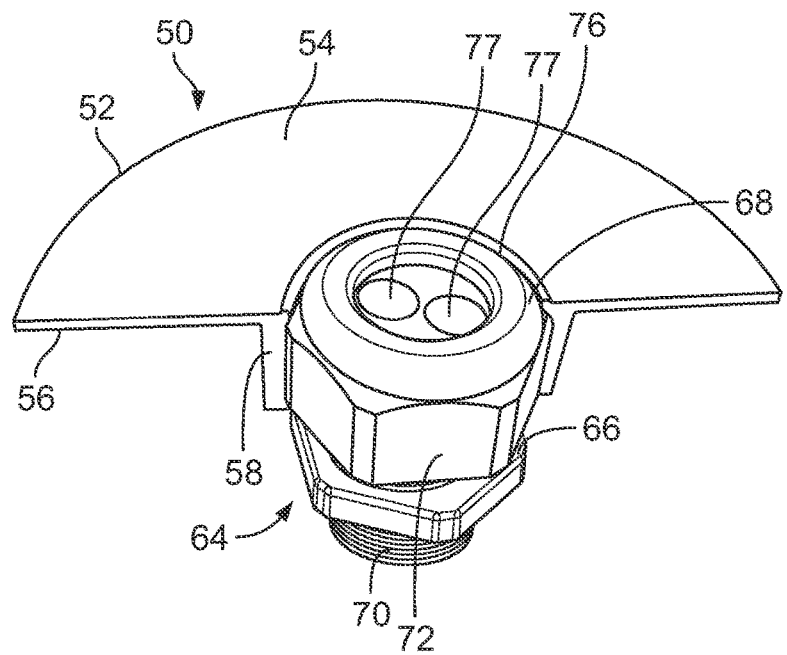
FIG. 8 is a photo of top perspective view of the base plate and sealing gland shown in FIG. 7.

Referring to FIGS. 7 and 8, the passthrough 10 includes a base plate 50 having a base 52 with first surface 54 and a second surface 56 opposite the first surface 54, and a tubular member 58 extending outwardly from the second surface 56 of the base 52. In an embodiment, the tubular member 58 of the base plate 50 includes a first end 60 located at the base 52 and a second end 62 opposite the first end 60 and distal from the base 52. In an embodiment, the tubular member 58 is sized and shaped to be positioned through the aperture 40 of the passthrough 10 and the aperture 102 of the roof deck 100 when the passthrough 10 is installed on the roof deck 100. In an embodiment, the base 52 of the base plate 50 is configured to be positioned substantially flush with the roof deck 100. In an embodiment, the base plate 50 is made from plastic. In an embodiment, the base plate 50 is made from polypropylene. In an embodiment, the base plate 50 is made from a polymer blend with polypropylene as a base resin. In another embodiment, the base plate 50 is made from thermoplastic polyolefin (TPO). In another embodiment, the TPO is a modified TPO including fiberglass and/or other filler material. In another embodiment, the base plate 50 is made from metal. In an embodiment, the base plate 50 is made of aluminum. In another embodiment, the base plate 50 is made of stainless steel.

In an embodiment, a thickness of the base 52 of the base plate 50 is in a range of 0.5 mm to 5 mm. In another embodiment, the thickness of the base 52 of the base plate 50 is in a range of 1 mm to 5 mm. In another embodiment, the thickness of the base 52 of the base plate 50 is in a range of 1.5 mm to 5 mm. In another embodiment, the thickness of the base 52 of the base plate 50 is in a range of 2 mm to 5 mm. In another embodiment, the thickness of the base 52 of the base plate 50 is in a range of 2.5 mm to 5 mm. In another embodiment, the thickness of the base 52 of the base plate 50 is in a range of 3 mm to 5 mm. In another embodiment, the thickness of the base 52 of the base plate 50 is in a range of 3.5 mm to 5 mm. In another embodiment, the thickness of the base 52 of the base plate 50 is in a range of 4 mm to 5 mm. In another embodiment, the thickness of the base 52 of the base plate 50 is in a range of 4.5 mm to 5 mm.

In another embodiment, the thickness of the base 52 of the base plate 50 is in a range of 0.5 mm to 4.5 mm. In another embodiment, the thickness of the base 52 of the base plate 50 is in a range of 1 mm to 4.5 mm. In another embodiment, the thickness of the base 52 of the base plate 50 is in a range of 1.5 mm to 4.5 mm. In another embodiment, the thickness of the base 52 of the base plate 50 is in a range of 2 mm to 4.5 mm. In another embodiment, the thickness of the base 52 of the base plate 50 is in a range of 2.5 mm to 4.5 mm. In another embodiment, the thickness of the base 52 of the base plate 50 is in a range of 3 mm to 4.5 mm. In another embodiment, the thickness of the base 52 of the base plate 50 is in a range of 3.5 mm to 4.5 mm. In another embodiment, the thickness of the base 52 of the base plate 50 is in a range of 4 mm to 4.5 mm.

In another embodiment, the thickness of the base 52 of the base plate 50 is in a range of 0.5 mm to 4 mm. In another embodiment, the thickness of the base 52 of the base plate 50 is in a range of 1 mm to 4 mm. In another embodiment, the thickness of the base 52 of the base plate 50 is in a range of 1.5 mm to 4 mm. In another embodiment, the thickness of the base 52 of the base plate 50 is in a range of 2 mm to 4 mm. In another embodiment, the thickness of the base 52 of the base plate 50 is in a range of 2.5 mm to 4 mm. In another embodiment, the thickness of the base 52 of the base plate 50 is in a range of 3 mm to 4 mm. In another embodiment, the thickness of the base 52 of the base plate 50 is in a range of 3.5 mm to 4 mm.

In another embodiment, the thickness of the base 52 of the base plate 50 is in a range of 0.5 mm to 3.5 mm. In another embodiment, the thickness of the base 52 of the base plate 50 is in a range of 1 mm to 3.5 mm. In another embodiment, the thickness of the base 52 of the base plate 50 is in a range of 1.5 mm to 3.5 mm. In another embodiment, the thickness of the base 52 of the base plate 50 is in a range of 2 mm to 3.5 mm. In another embodiment, the thickness of the base 52 of the base plate 50 is in a range of 2.5 mm to 3.5 mm. In another embodiment, the thickness of the base 52 of the base plate 50 is in a range of 3 mm to 3.5 mm.

In another embodiment, the thickness of the base 52 of the base plate 50 is in a range of 0.5 mm to 3 mm. In another embodiment, the thickness of the base 52 of the base plate 50 is in a range of 1 mm to 3 mm. In another embodiment, the thickness of the base 52 of the base plate 50 is in a range of 1.5 mm to 3 mm. In another embodiment, the thickness of the base 52 of the base plate 50 is in a range of 2 mm to 3 mm. In another embodiment, the thickness of the base 52 of the base plate 50 is in a range of 2.5 mm to 3 mm.

In another embodiment, the thickness of the base 52 of the base plate 50 is in a range of 0.5 mm to 2.5 mm. In another embodiment, the thickness of the base 52 of the base plate 50 is in a range of 1 mm to 2.5 mm. In another embodiment, the thickness of the base 52 of the base plate 50 is in a range of 1.5 mm to 2.5 mm. In another embodiment, the thickness of the base 52 of the base plate 50 is in a range of 2 mm to 2.5 mm.

In another embodiment, the thickness of the base 52 of the base plate 50 is in a range of 0.5 mm to 2 mm. In another embodiment, the thickness of the base 52 of the base plate 50 is in a range of 1 mm to 2 mm. In another embodiment, the thickness of the base 52 of the base plate 50 is in a range of 1.5 mm to 2 mm. In another embodiment, the thickness of the base 52 of the base plate 50 is in a range of 0.5 mm to 1.5 mm. In another embodiment, the thickness of the base 52 of the base plate 50 is in a range of 1 mm to 1.5 mm. In another embodiment, the thickness of the base 52 of the base plate 50 is in a range of 0.5 mm to 1 mm.

Referring to FIGS. 7 and 8, in an embodiment, the passthrough 10 includes a cable gland 64 installed within the base plate 50. In an embodiment, the cable gland 64 includes a body 66 having a first end 68 and a second end 70 opposite the first end 68. In an embodiment, the body 66 includes a sealing nut 72 located at the first end 68 of the body 66. In an embodiment, the sealing nut 72 is sized and shaped to be positioned within the tubular member 58 of the base plate 50. In an embodiment, a raceway 74 is attached to the second end 70 of the body 66 of the cable gland 64 (see FIG. 5). In an embodiment, the second end 70 of the body 66 of the cable gland 64 includes external threads 75. In an embodiment, the raceway 74 includes internal threads that threadedly mate with the external threads 75 of the cable gland 64. In an embodiment, the cable gland 64 includes a grommet 76 at the first end 68 of the body 66. In an embodiment, the grommet 76 is substantially flush with the first surface 54 of the base 52 of the base plate 50. In another embodiment, the grommet 76 is flush with the first surface 54 of the base 52 of the base plate 50.

Figure 9:
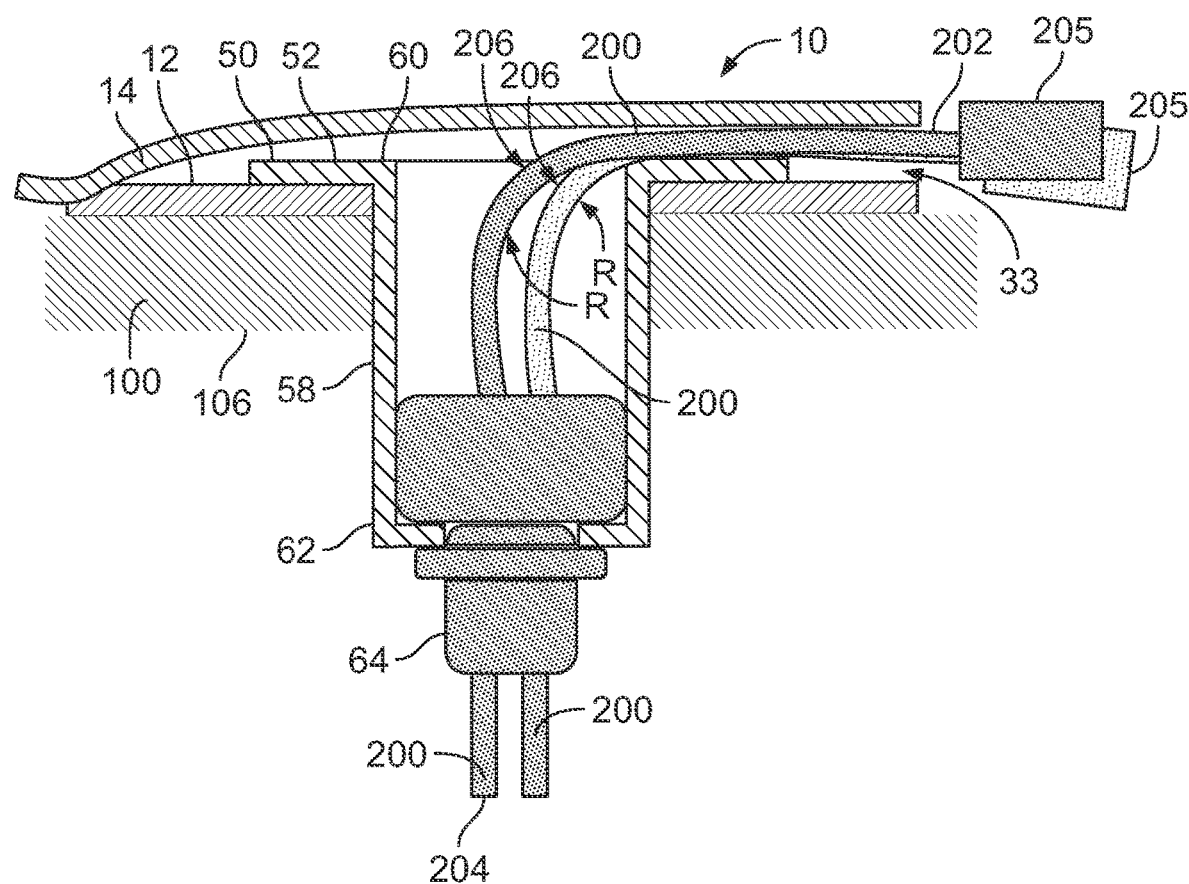
FIG. 9 is a schematic side elevational view of an embodiment of an electrical cable passthrough.

Referring to FIGS. 8 and 9, in an embodiment, the cable gland 64 is positioned within the tubular member 58 at the second end 62 thereof. In another embodiment, the grommet 76 is positioned at the second end 62 of the tubular member 58. In an embodiment, the grommet 76 is positioned below an inner surface 106 of the roof deck 100 when the passthrough 10 is installed on the roof deck 100. In an embodiment, the grommet 76 includes at least one wire hole 77 that is sized and shaped to receive a corresponding one of the at least one cable 200. In an embodiment, the passthrough 10 is configured to receive the least one cable 200 having a bend 206 with a bend radius R in a range of 10 mm to 20 mm. In another embodiment, the bend radius R is in a range of 11 mm to 20 mm. In another embodiment, the bend radius R is in a range of 12 mm to 20 mm. In another embodiment, the bend radius R is in a range of 13 mm to 20 mm. In another embodiment, the bend radius R is in a range of 14 mm to 20 mm. In another embodiment, the bend radius R is in a range of 15 mm to 20 mm. In another embodiment, the bend radius R is in a range of 16 mm to 20 mm. In another embodiment, the bend radius R is in a range of 17 mm to 20 mm. In another embodiment, the bend radius R is in a range of 18 mm to 20 mm. In another embodiment, the bend radius R is in a range of 19 mm to 20 mm.

In another embodiment, the bend radius R is in a range of 10 mm to 19 mm. In another embodiment, the bend radius R is in a range of 11 mm to 19 mm. In another embodiment, the bend radius R is in a range of 12 mm to 19 mm. In another embodiment, the bend radius R is in a range of 13 mm to 19 mm. In another embodiment, the bend radius R is in a range of 14 mm to 19 mm. In another embodiment, the bend radius R is in a range of 15 mm to 19 mm. In another embodiment, the bend radius R is in a range of 16 mm to 19 mm. In another embodiment, the bend radius R is in a range of 17 mm to 19 mm. In another embodiment, the bend radius R is in a range of 18 mm to 19 mm.

In another embodiment, the bend radius R is in a range of 10 mm to 18 mm. In another embodiment, the bend radius R is in a range of 11 mm to 18 mm. In another embodiment, the bend radius R is in a range of 12 mm to 18 mm. In another embodiment, the bend radius R is in a range of 13 mm to 18 mm. In another embodiment, the bend radius R is in a range of 14 mm to 18 mm. In another embodiment, the bend radius R is in a range of 15 mm to 18 mm. In another embodiment, the bend radius R is in a range of 16 mm to 18 mm. In another embodiment, the bend radius R is in a range of 17 mm to 18 mm.

In another embodiment, the bend radius R is in a range of 10 mm to 17 mm. In another embodiment, the bend radius R is in a range of 11 mm to 17 mm. In another embodiment, the bend radius R is in a range of 12 mm to 17 mm. In another embodiment, the bend radius R is in a range of 13 mm to 17 mm. In another embodiment, the bend radius R is in a range of 14 mm to 17 mm. In another embodiment, the bend radius R is in a range of 15 mm to 17 mm. In another embodiment, the bend radius R is in a range of 16 mm to 17 mm.

In another embodiment, the bend radius R is in a range of 10 mm to 16 mm. In another embodiment, the bend radius R is in a range of 11 mm to 16 mm. In another embodiment, the bend radius R is in a range of 12 mm to 16 mm. In another embodiment, the bend radius R is in a range of 13 mm to 16 mm. In another embodiment, the bend radius R is in a range of 14 mm to 16 mm. In another embodiment, the bend radius R is in a range of 15 mm to 16 mm.

In another embodiment, the bend radius R is in a range of 10 mm to 15 mm. In another embodiment, the bend radius R is in a range of 11 mm to 15 mm. In another embodiment, the bend radius R is in a range of 12 mm to 15 mm. In another embodiment, the bend radius R is in a range of 13 mm to 15 mm. In another embodiment, the bend radius R is in a range of 14 mm to 15 mm.

In another embodiment, the bend radius R is in a range of 10 mm to 14 mm. In another embodiment, the bend radius R is in a range of 11 mm to 14 mm. In another embodiment, the bend radius R is in a range of 12 mm to 14 mm. In another embodiment, the bend radius R is in a range of 13 mm to 14 mm.

In another embodiment, the bend radius R is in a range of 10 mm to 13 mm. In another embodiment, the bend radius R is in a range of 11 mm to 13 mm. In another embodiment, the bend radius R is in a range of 12 mm to 13 mm. In another embodiment, the bend radius R is in a range of 10 mm to 12 mm. In another embodiment, the bend radius R is in a range of 11 mm to 12 mm. In another embodiment, the bend radius R is in a range of 10 mm to 11 mm.

Figure 10:
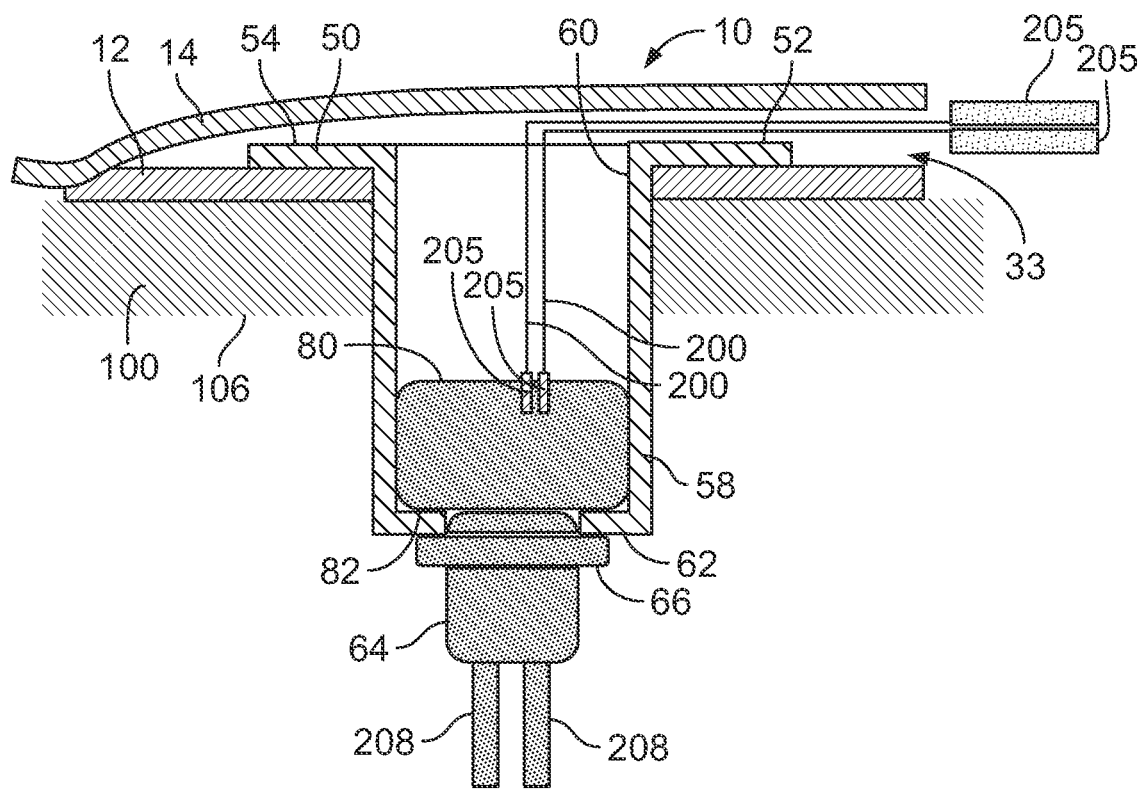
FIG. 10 is a schematic side elevational view of an embodiment of an electrical cable passthrough.
Figure 11:
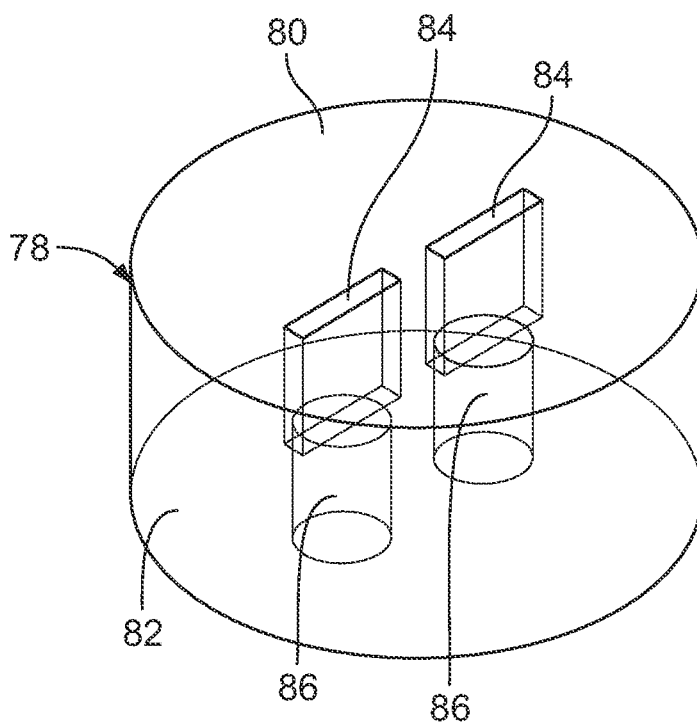
FIG. 11 is a top perspective view of an embodiment of a socket employed by the electrical cable passthrough of FIG. 10.
Figure 14:
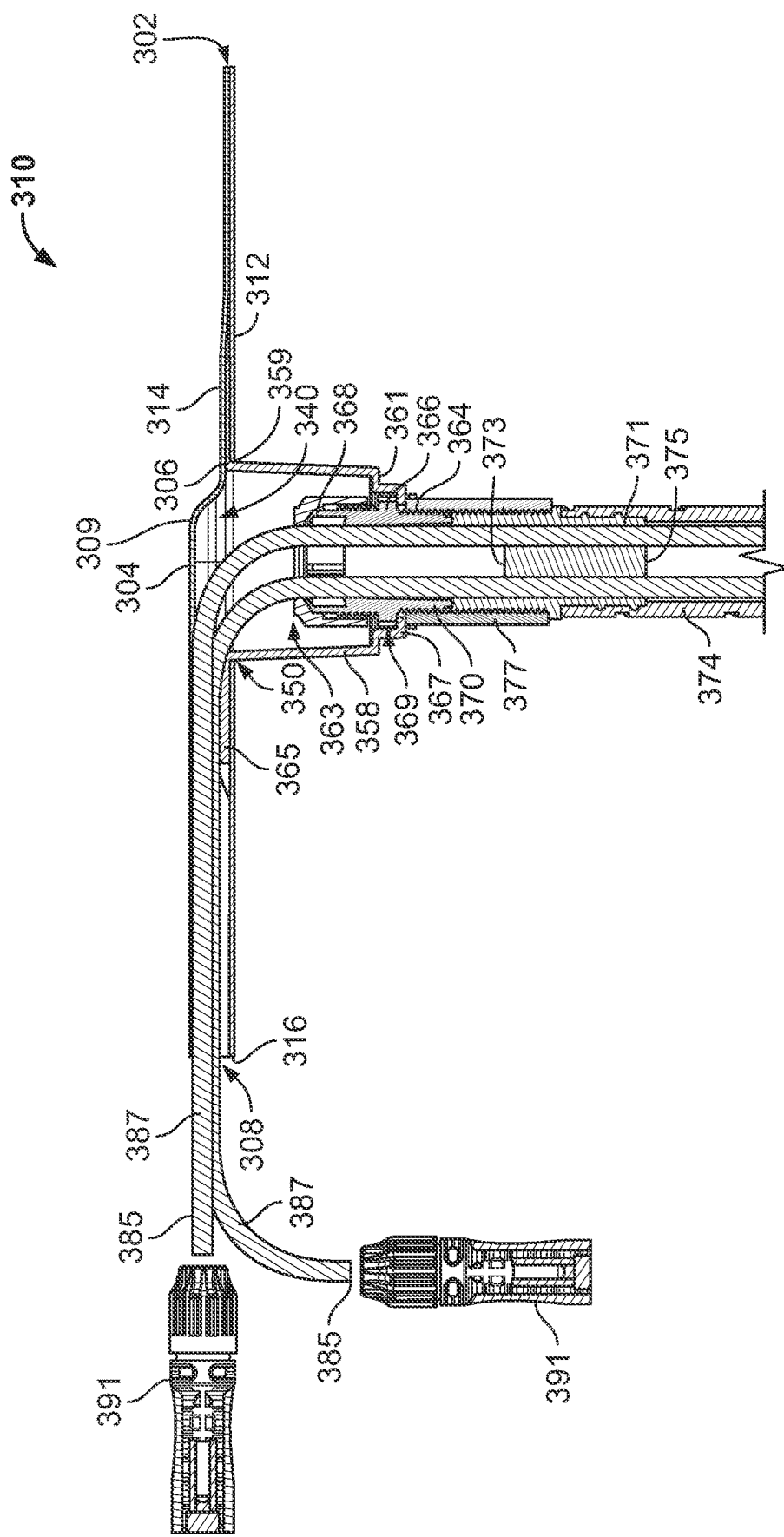
FIG. 14 shows a side cross-sectional view of the electrical cable passthrough shown in FIGS. 12 and 13.

Referring to FIGS. 10 and 11, in another embodiment, the cable gland 64 includes a socket 78 located at the first end 68 of the body 66. In another embodiment, the socket 78 is positioned at the second end 62 of the tubular member 58. In an embodiment, the socket 78 is positioned below the inner surface 106 of the roof deck 100 when the passthrough 10 is installed on the roof deck 100. In another embodiment, the socket 78 is substantially flush with the first surface 54 of the base 52 of the base plate 50.

Still referring to FIGS. 10 and 11, in an embodiment, the socket 78 includes a first surface 80, a second surface 82 opposite the first surface 80, at least one first receptacle 84 within the first surface 80, and at least one second receptacle 86 within the second surface 82 and in communication with a corresponding one of the at least one first receptacle 84. In an embodiment, the at least one first receptacle 84 includes a plurality of first receptacles 84, and the at least one second receptacle 86 includes a plurality of second receptacles 86. In an embodiment, the socket 78 includes two of the first receptacles 84 and two of the second receptacles 86. In an embodiment, each of the receptacles 84 is configured to receive the connector 205 of a corresponding one of the cables 200, and each of second receptacles 86 is configured to receive a connector of a cable 208. In an embodiment, each of the cables 200 includes a flat wire. In another embodiment, the cable 208 includes a round wire. In another embodiment, each of the cables 200, 208 includes a flat wire. In another embodiment, each of the cables 200, 208 includes a round wire. In an embodiment, the opening 33 is sealed with the sealant as referenced above.

In an embodiment, the passthrough 10 is configured for use with electrical systems of building-integrated photovoltaic (BIPV) systems. In another embodiment, the passthrough 10 is configured for use with retrofit photovoltaic systems for roofing. In other embodiments, the passthrough 10 is configured for use with other electrical systems.

FIGS. 12 through 15 show an embodiment of an electrical cable passthrough 310. The electrical cable passthrough 310 has a structure and function similar to the electrical cable passthrough 10 with the following noted differences. In an embodiment, the electrical cable passthrough 310 includes top portion 302 having a first layer 312, a second layer 314 overlapping the first layer 312, and a raised channel 304 extending outwardly from a first surface 306 of the second layer 314. In an embodiment, the channel 304 extends from an opening 308 located proximate to a first edge 316 of the top portion 302 to an end 309 located proximate to a central point of the top portion 302. In an embodiment, the end 309 is integral with a centrally-located aperture 340 extending through the first layer 312. In an embodiment, the top portion 302 is configured to be positioned substantially flush with a roof deck.

In an embodiment, the electrical cable passthrough 310 includes a flange element 350 having a tubular portion 358 with a first end 359, a second end 361 opposite the first end 359, and an aperture 363 extending from the first end 359 to the second end 361, and a flanged portion 365 extending radially from the first end 359. In an embodiment, an annular tip 367 extends from the second end 361 of the tubular portion 358 and includes a chamber 369. In an embodiment, the tubular portion 358 tapers from the first end 359 to the second end 361. In an embodiment, the flange element 350 is inserted within the aperture 340 of the first layer 312. In an embodiment, the flanged portion 365 of the flange element 350 is located intermediate the first layer 312 and the second layer 314 and the tubular portion 358 extends outwardly from the first layer 312.

In an embodiment, a cable gland 364 includes a first end 368 and a second end 370 opposite the first end 368. In an embodiment, the cable gland 364 is located within the tubular portion 358 of the flange element 350. In an embodiment, a body portion 366 of the cable gland 364 is located within the chamber 369 of the flange element 350. In an embodiment, a connector 371 includes a first end 373 and a second end 375 opposite the first end 373. In an embodiment, a coupler 377 couples the first end 373 of the connector 371 with the second end 370 of the cable gland 364. In an embodiment, the coupler 377 includes internal threads that threadedly engage external threads of the cable gland 364. In an embodiment, a conduit 374 includes a first end 379 and a second end 381 opposite the first end 379. In an embodiment, the first end 379 of the conduit 374 is attached to the second end 375 of the connector 371. In an embodiment, a second connector 383 is connected to the second end 381 of the conduit 374. In an embodiment, the conduit 374 is a flexible conduit.

In an embodiment, the channel 304 and aperture 340 of the passthrough 310 are sized and shaped to receive a first end 385 of the at least one cable 387. In an embodiment, the at least one cable 387 extends through the conduit 374 and a second end 389 of the at least one cable 387 extends from the second end 381 of the conduit 374. In an embodiment, each of the first end 385 and the second end 389 of the at least one cable 387 includes an electrical connector 391. In an embodiment, the cable gland 364 secures the first end 385 of the at least one cable 387. In an embodiment, the at least one cable 387 includes a pair of the cables 387. In another embodiment, the at least one cable 387 includes four of the cables 387. In other embodiments, the at least one cable 387 includes any number of the cables 387.

Figure 16:
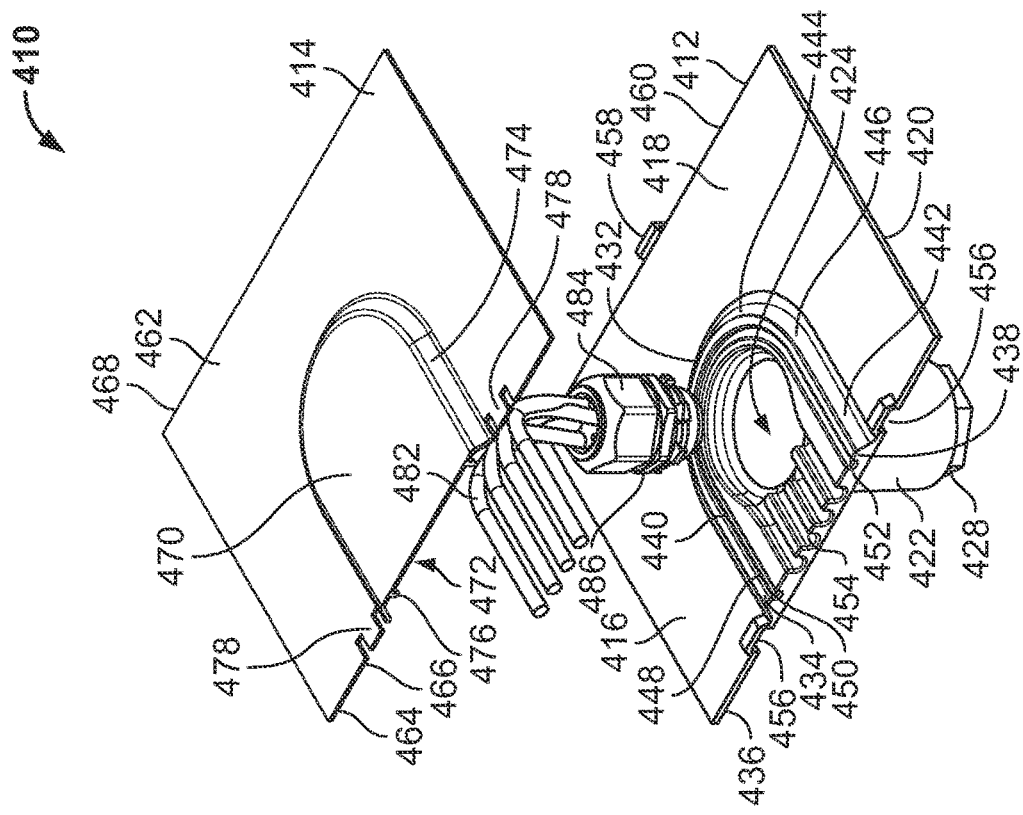
FIGS. 15 and 16 show a top perspective view and an exploded perspective view, respectively, of an embodiment of an electrical cable passthrough.
Figure 15:
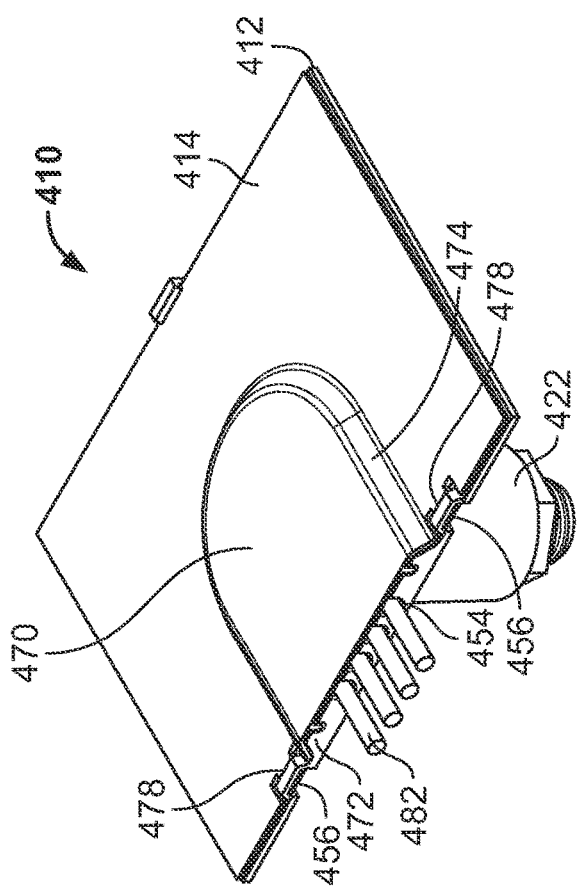
Figure 17:
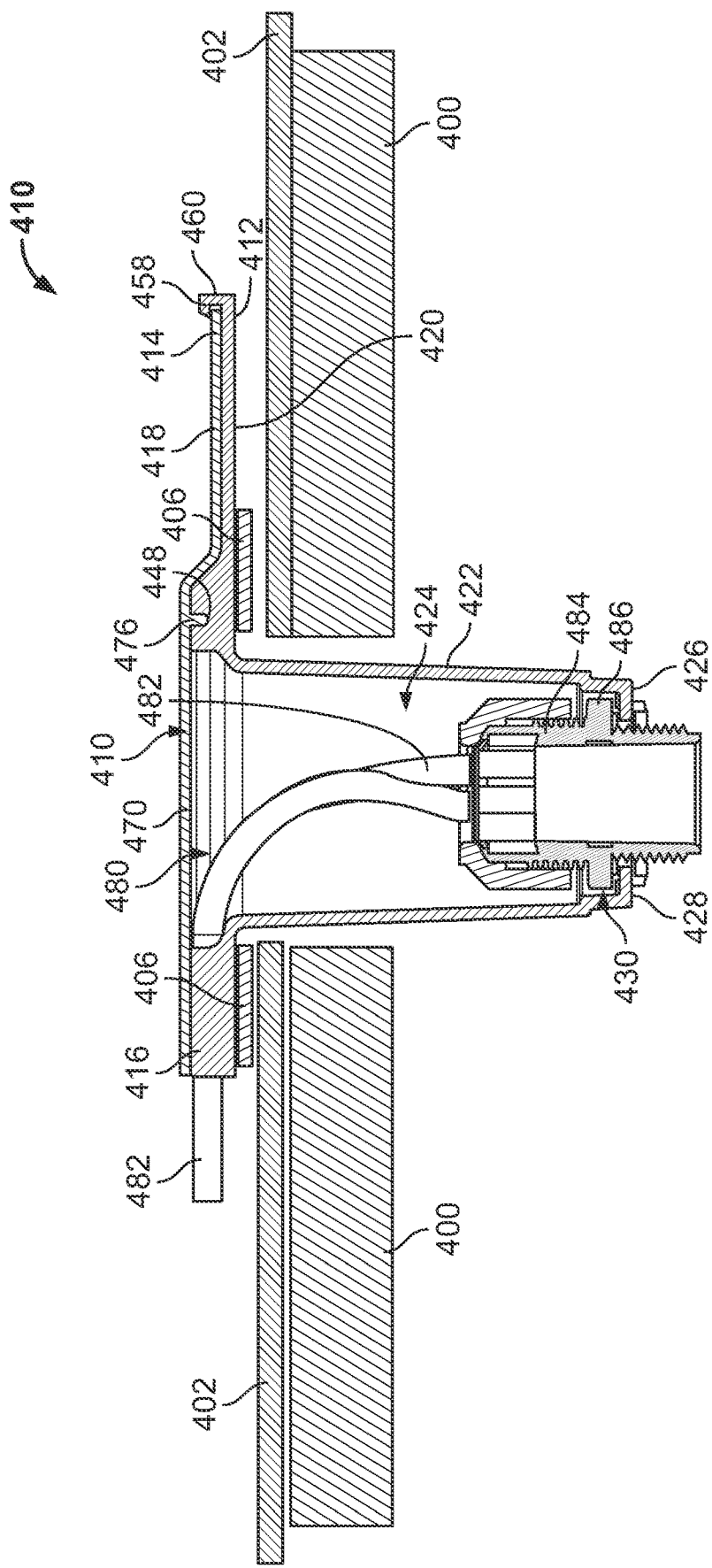
FIG. 17 shows a side cross-sectional view of the electrical cable passthrough shown in FIGS. 15 and 16.

Referring to FIGS. 15 through 17, in an embodiment, an electrical cable passthrough 410 includes a base 412 and a cover 414 attached removably to the base 412. In an embodiment, the base 412 includes a plate 416 having first surface 418, a second surface 420 opposite the first surface 418, and a tubular portion 422 extending outwardly from the second surface 420. In an embodiment, the tubular portion 422 is integral with the plate 416. In an embodiment, an aperture 424 extends through the tubular portion 422 from the first surface 418 of the plate 416 to an end 426 of the tubular portion 422. In an embodiment, the tubular portion 422 includes a tip 428 having a chamber 430.

In an embodiment, a sidewall 432 extends from the first surface 418 of the plate 416. In an embodiment, the sidewall 432 partially surrounds the aperture 424. In an embodiment, the sidewall 432 extends from a first end 434 located at a first side 436 of the plate 416, around the aperture 424, and to a second end 438 located at the first side 436 of the plate 416. In an embodiment, the first end 434 is spaced apart from the second end 438. In an embodiment, the sidewall 432 is U-shaped. In an embodiment, the sidewall 432 includes a first leg 440 that extends from the first end 434 and is proximate to one side of the aperture 424, a second leg 442 that extends from the second end 438 and is proximate to an opposite side of the aperture 424, and a curved portion 444 concentric with the aperture 424 and joining the first leg 440 and second leg 442. In an embodiment, the sidewall 432 includes an outer edge 446. In an embodiment, the outer edge 446 is oblique relative to the first surface 418 of the plate 416. In an embodiment, a channel 448 is formed within the sidewall 432. In an embodiment, the channel 448 extends from a first end 450 located at the first side 436 and a second end 452 located at the first side 436. In an embodiment, a cross-section of the channel 448 is semicircular in shape. In other embodiments, the cross-section of the channel 448 includes other shapes, e.g., square, triangular, rectangular.

In an embodiment, at least one cable channel 454 extends from the first side 436 to the aperture 424. In an embodiment, the at least one cable channel 454 includes a plurality of channels 454. In an embodiment, the plurality of cable channels 454 includes two of the cable channels 454. In another embodiment, the plurality of cable channels 454 includes four of the cable channels 454. In other embodiments, the at least one cable channel 454 includes any number of the cable channels 454. In an embodiment, a cross-section of the at least one cable channel 454 is semi-circular in shape. In other embodiments, the cross-section of the at least one cable channel 454 includes other shapes, e.g., square, triangular, rectangular.

In an embodiment, the plate 416 includes at least one slot 456 located at the first side 436. In an embodiment, the at least one slot 456 includes a plurality of slots 456. In an embodiment, the plate 416 includes at least one tab 458 located at a second side 460. In an embodiment, the at least one tab 458 includes a plurality of tabs 458.

In an embodiment, the base 412 is made from plastic. In an embodiment, the base 412 is made from polypropylene. In an embodiment, the base 412 is made from a polymer blend with polypropylene as a base resin. In another embodiment, the base 412 is made from thermoplastic polyolefin (TPO). In another embodiment, the TPO is a modified TPO including fiberglass and/or other filler material. In another embodiment, the base 412 is made from metal. In an embodiment, the base 412 is made of aluminum. In another embodiment, the base 412 is made of stainless steel.

Still referring to FIGS. 15 through 17, in an embodiment, the cover 414 includes a first surface 462 and a second surface 464 opposite the first surface 462, a first edge 466 and a second edge 468 opposite the first edge 466. In an embodiment, the cover 414 includes a raised portion 470 extending from the first surface 462 and having an opening 472 located in the first edge 466. In an embodiment, the raised portion 470 includes a sidewall 474. In an embodiment, the sidewall 474 is oblique relative to the first surface 462. In an embodiment, the raised portion 470 is U-shaped. In an embodiment, the raised portion 470 includes a tab 476 extending outwardly from the second surface 464. In an embodiment, the raised portion 470 is sized and shaped to overlay the sidewall 432 of the base 412. In an embodiment, the sidewall 474 of the raised portion 470 of the cover 414 is sized and shaped to overlay the edge 446 of the sidewall 432 of the base 412. In an embodiment, the channel 448 of the base 412 is sized and shaped to receive the tab 476 of the raised portion 470 of the cover 414. In an embodiment, the raised portion 470 covers the aperture 424.

In an embodiment, the cover 414 includes at least one tab 478 formed within the first edge 466 thereof. In an embodiment, the at least one slot 456 of the base 412 is sized and shaped to receive the at least one tab 478 to removably maintain the cover 414 on the base 412. In an embodiment, the at least one tab 478 includes a plurality of the tabs 478. In an embodiment, each of the plurality of slots 456 is sized and shaped to receive a corresponding one of the plurality of tabs 478. In an embodiment, the tab 458 of the base 412 is sized and shaped to receive the second edge 468 of the cover 414 to removably maintain the cover 414 on the base 412.

In an embodiment, the cover 414 is made from plastic. In an embodiment, the cover 414 is made from polypropylene. In an embodiment, the cover 414 is made from a polymer blend with polypropylene as a base resin. In another embodiment, the cover 414 is made from thermoplastic polyolefin (TPO). In another embodiment, the TPO is a modified TPO including fiberglass and/or other filler material. In another embodiment, the cover 414 is made from metal. In an embodiment, the cover 414 is made of aluminum. In another embodiment, the cover 414 is made of stainless steel.

In an embodiment, the cover 414 and the base 412 form an interior portion 480. In an embodiment, the interior portion 480 is sized and shaped to receive at least one cable 482. In an embodiment, the at least one cable channel 454 is sized and shaped to receive a first end of the at least one cable 482. In an embodiment, each of the plurality of the cable channels 454 is sized and shaped to receive a corresponding one of the plurality of the cables 482. In an embodiment, a cable gland 484 receives the at least one cable 482. In an embodiment, the cable gland 484 is positioned within the tubular portion 422. In an embodiment, a body portion 486 of the cable gland 484 is located within the chamber 430 of the tubular portion 422.

In an embodiment, the electrical cable passthrough 410 is installed on a roof deck 400. In an embodiment, an underlayment layer 402 overlays the roof deck 400. In an embodiment, the electrical cable passthrough 410 is installed on the underlayment layer 402. In an embodiment, a sealant 406 is applied intermediate the underlayment layer 402 and the base 412 of the electrical cable passthrough 410. In an embodiment, the sealant 406 includes butyl, silicone, rubber, epoxy, latex, neoprene, or polyurethane foam.

Figure 18:
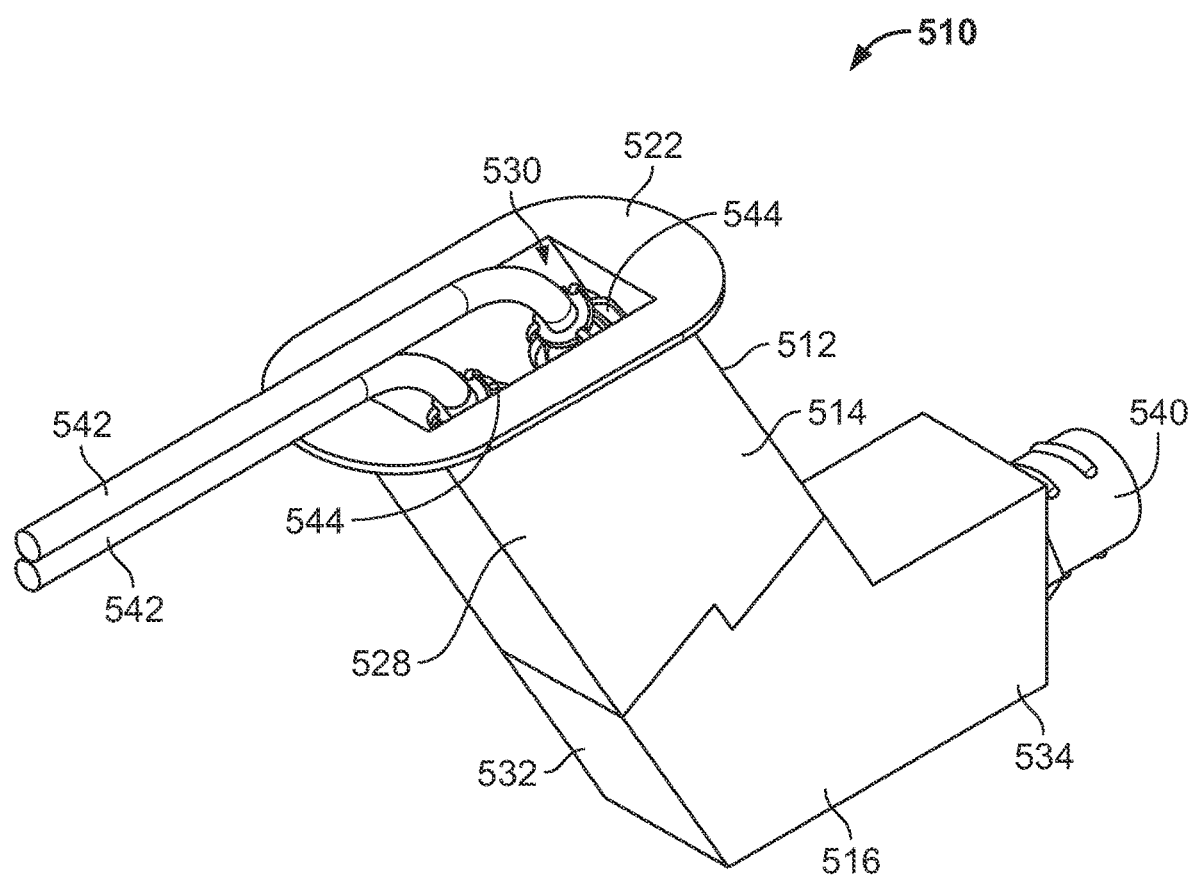
FIGS. 18 and 19 show a perspective view and an exploded perspective view, respectively, of an embodiment of insert of an electrical cable passthrough.
Figure 19:
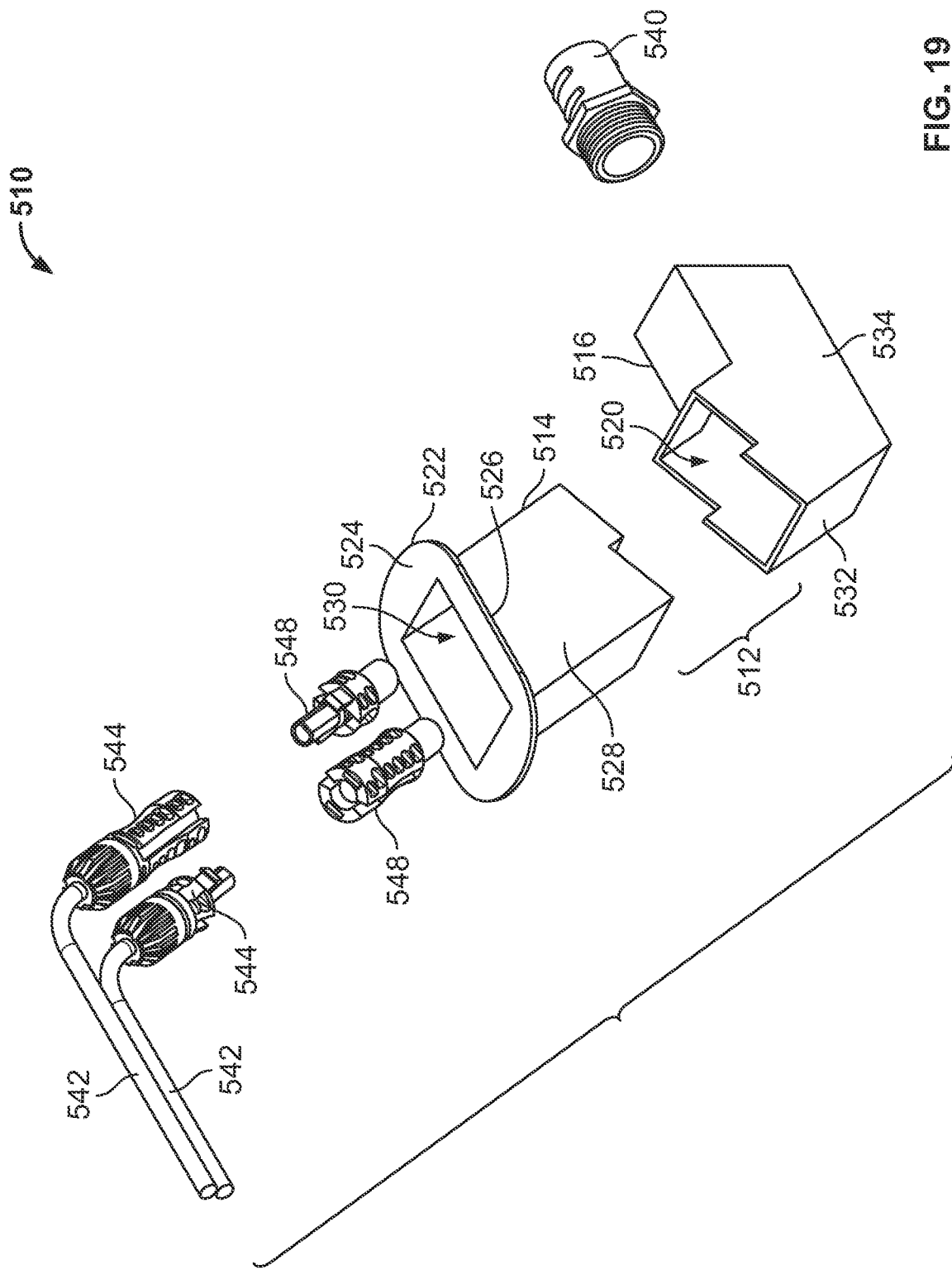
Figure 20:
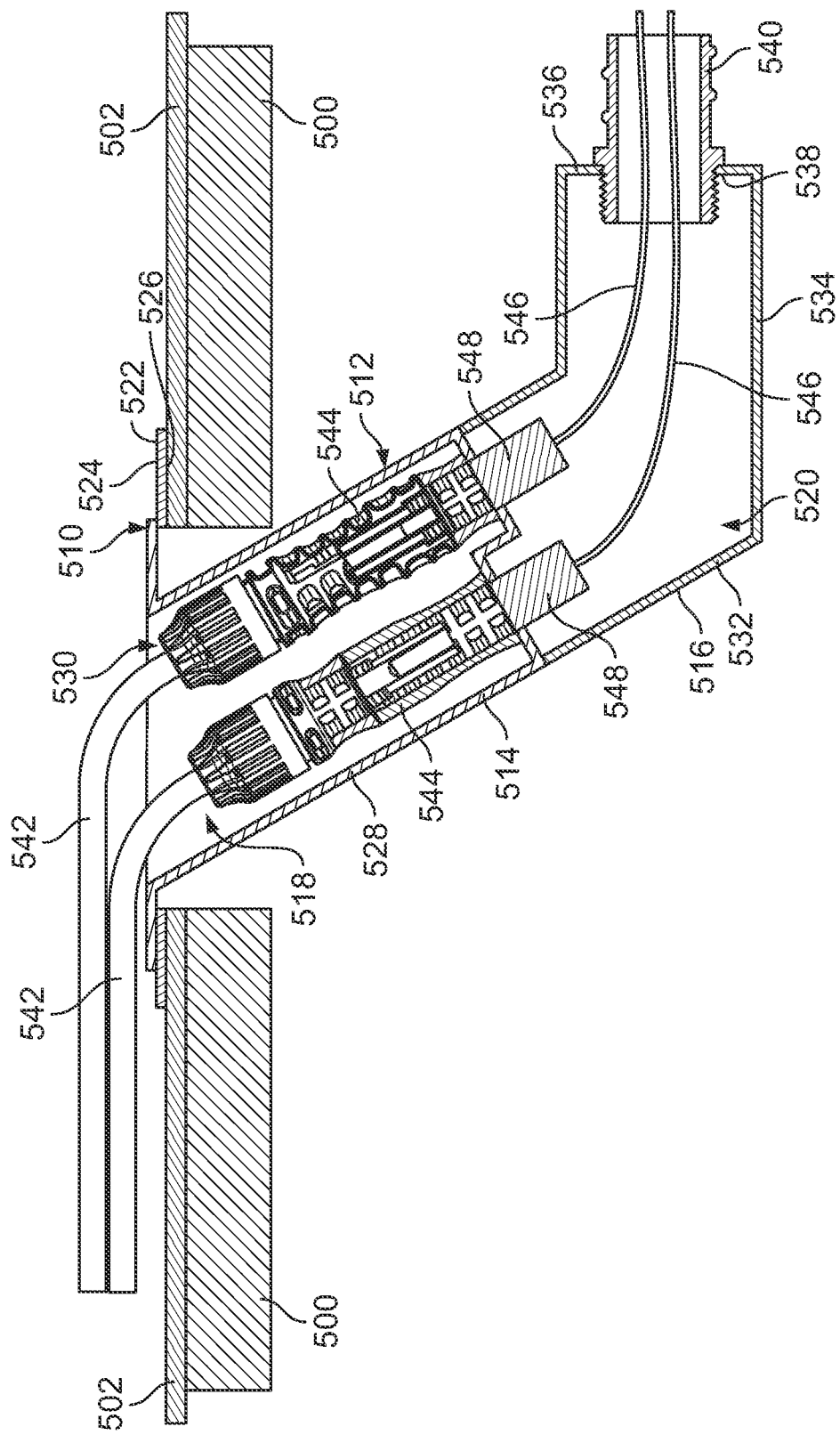
FIG. 20 shows a side cross-sectional view of an electrical cable passthrough including the insert shown in FIGS. 18 and 19.

Referring to FIGS. 18 through 20, in an embodiment, an electrical cable passthrough 510 includes a body portion 512 having a first section 514 and a second section 516 removably connected to the first section 514. In an embodiment, the first section 514 is hollow and includes an interior portion 518. In an embodiment, the second section 516 is hollow and includes an interior portion 520.

In an embodiment, the first section 514 includes a base 522 having a first surface 524 and a second surface 526 opposite the first surface 524 and a tubular portion 528 extending from the second surface 526. In an embodiment, the base 522 includes an aperture 530 extending from the first surface 524 to the interior portion 518 of the tubular portion 528. In an embodiment, the aperture 530 is square in shape. In an embodiment, the aperture 530 is circular in shape. In another embodiment, the aperture 530 is rectangular in shape. In an embodiment, the tubular portion 528 includes a square cross-section. In another embodiment, the tubular portion 528 includes a circular cross-section. In another embodiment, the tubular portion 528 includes a rectangular cross-section. In an embodiment, the tubular portion 528 extends obliquely relative to the base 522.

In an embodiment, the tubular portion 528 extends 30 degrees to 90 degrees relative to the base 522. In another embodiment, the tubular portion 528 extends 30 degrees to 80 degrees relative to the base 522. In another embodiment, the tubular portion 528 extends 30 degrees to 70 degrees relative to the base 522. In another embodiment, the tubular portion 528 extends 30 degrees to 60 degrees relative to the base 522. In another embodiment, the tubular portion 528 extends 30 degrees to 50 degrees relative to the base 522. In another embodiment, the tubular portion 528 extends 30 degrees to 40 degrees relative to the base 522.

In an embodiment, the tubular portion 528 extends 40 degrees to 90 degrees relative to the base 522. In another embodiment, the tubular portion 528 extends 40 degrees to 80 degrees relative to the base 522. In another embodiment, the tubular portion 528 extends 40 degrees to 70 degrees relative to the base 522. In another embodiment, the tubular portion 528 extends 40 degrees to 60 degrees relative to the base 522. In another embodiment, the tubular portion 528 extends 40 degrees to 50 degrees relative to the base 522. In an embodiment, the tubular portion 528 extends 50 degrees to 90 degrees relative to the base 522. In another embodiment, the tubular portion 528 extends 50 degrees to 80 degrees relative to the base 522. In another embodiment, the tubular portion 528 extends 50 degrees to 70 degrees relative to the base 522. In another embodiment, the tubular portion 528 extends 50 degrees to 60 degrees relative to the base 522.

In an embodiment, the tubular portion 528 extends 60 degrees to 90 degrees relative to the base 522. In another embodiment, the tubular portion 528 extends 60 degrees to 80 degrees relative to the base 522. In another embodiment, the tubular portion 528 extends 60 degrees to 70 degrees relative to the base 522. In an embodiment, the tubular portion 528 extends 70 degrees to 90 degrees relative to the base 522. In another embodiment, the tubular portion 528 extends 70 degrees to 80 degrees relative to the base 522. In an embodiment, the tubular portion 528 extends 80 degrees to 90 degrees relative to the base 522.

In an embodiment, the second section 516 includes a first portion 532 and a second portion 534. In an embodiment, the first portion 532 extends obliquely relative to the second portion 534. In an embodiment, the first portion 532 extends 90 degrees to 120 degrees relative to the second portion 534. In another embodiment, the first portion 532 extends 90 degrees to 110 degrees relative to the second portion 534. In another embodiment, the first portion 532 extends 90 degrees to 100 degrees relative to the second portion 534. In an embodiment, the first portion 532 extends 100 degrees to 120 degrees relative to the second portion 534. In another embodiment, the first portion 532 extends 100 degrees to 110 degrees relative to the second portion 534. In an embodiment, the first portion 532 extends 110 degrees to 120 degrees relative to the second portion 534.

In an embodiment, the first section 514 is connected to the second section 516 by snap fitting. In another embodiment, the first section 514 is connected to the second section 516 by fasteners, such as screws, bolts, or rivets. In another embodiment, the first section 514 is connected to the second section 516 by an adhesive. In another embodiment, the first section 514 and the second section 516 are integral.

In an embodiment, the second portion 534 of the second section 516 includes an end wall 536 having an aperture 538. In an embodiment, the aperture 538 is sized and shaped to receive a fitting 540. In an embodiment, the fitting 540 is sized and shaped to receive a conduit.

In an embodiment, the electrical cable passthrough 510 is configured to be installed on a roof deck 500. In an embodiment, an underlayment layer 502 overlays the roof deck 500. In an embodiment, the base 522 overlays the underlayment layer 502. In an embodiment, the second portion 534 of the second section 516 is parallel to the roof deck 500. In an embodiment, the second portion 534 of the second section 516 is substantially parallel to the roof deck 500. In an embodiment, a sealant is applied intermediate the underlayment layer 502 and the base 512 of the electrical cable passthrough 510. In an embodiment, the sealant includes butyl, silicone, rubber, epoxy, latex, neoprene, or polyurethane foam.

In an embodiment, the interior portion 518 of the first section 514 is sized and shaped to receive at least one cable 542. In an embodiment, the at least one cable 542 extends from the aperture 530. In an embodiment, the at least one cable 542 includes a first electrical connector 544. In an embodiment, the interior portion 520 of the second section 516 is sized and shaped to receive at least one wire 546. In an embodiment, the at least one wire 546 includes a second electrical connector 548. In an embodiment, the at least one wire 546 extends through the fitting 540. In an embodiment, the first electrical connector 544 is removably connected to the second electrical connector 548. In an embodiment, the connected first electrical connector 544 and second electrical connector 548 reside within one or both of the first and second sections 514, 516. In an embodiment, the first electrical connector 544 is connected directly from a jumper module, jumper cable, or a module lead. In an embodiment, the second electrical connector 548 is a bulkhead (i.e., panel mount) connector. In an embodiment, the at least one cable 542 includes a plurality of the cables 542. In an embodiment, the at least one wire 546 includes a plurality of the wires 546.

Figure 22:
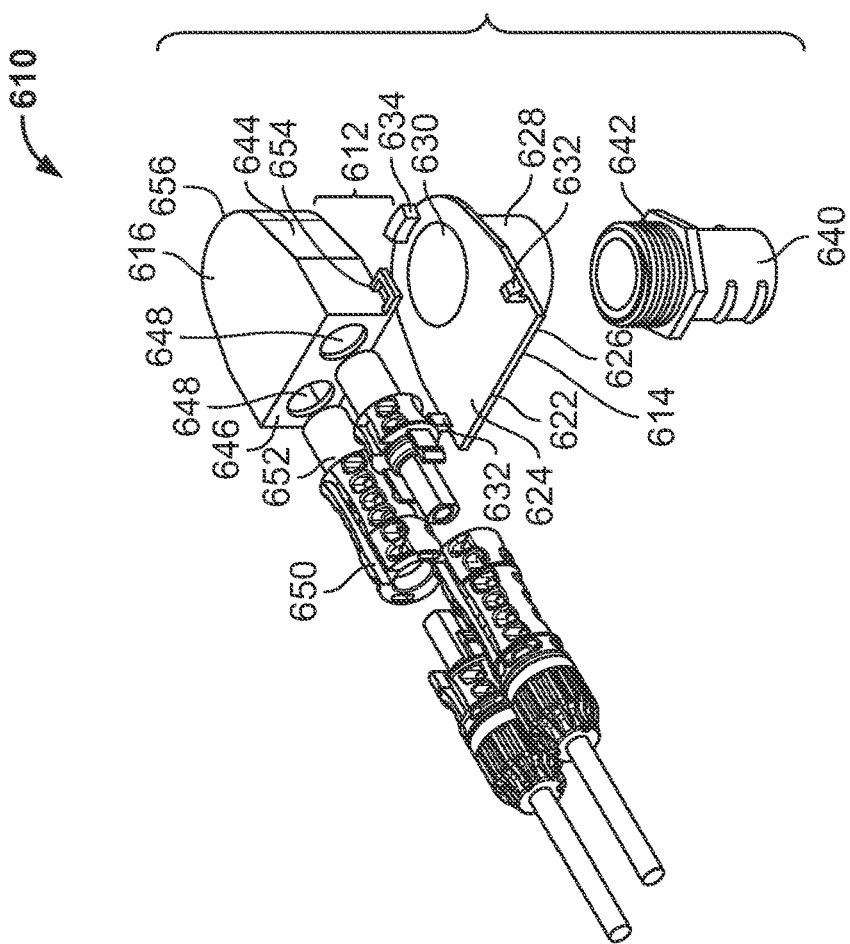
FIGS. 21 and 22 show a perspective view and an exploded perspective view, respectively, of an embodiment of insert of an electrical cable passthrough.
Figure 21:
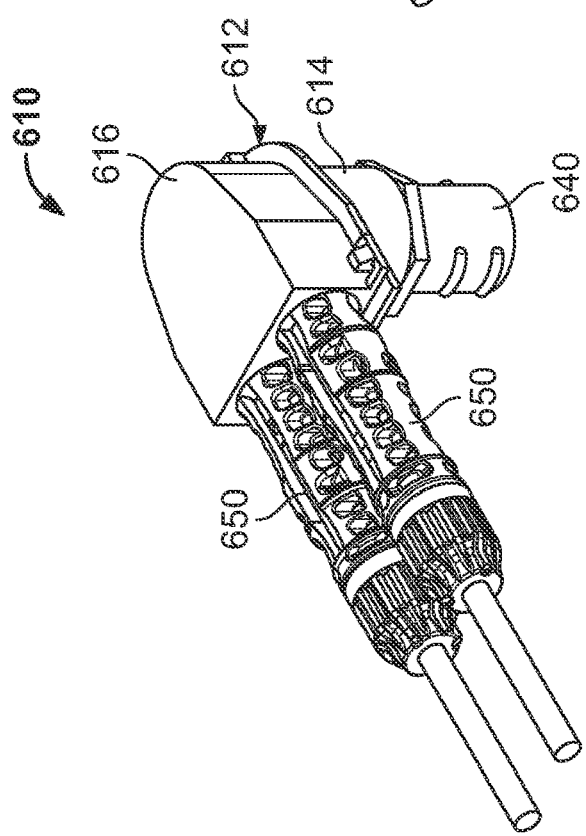
Figure 23:
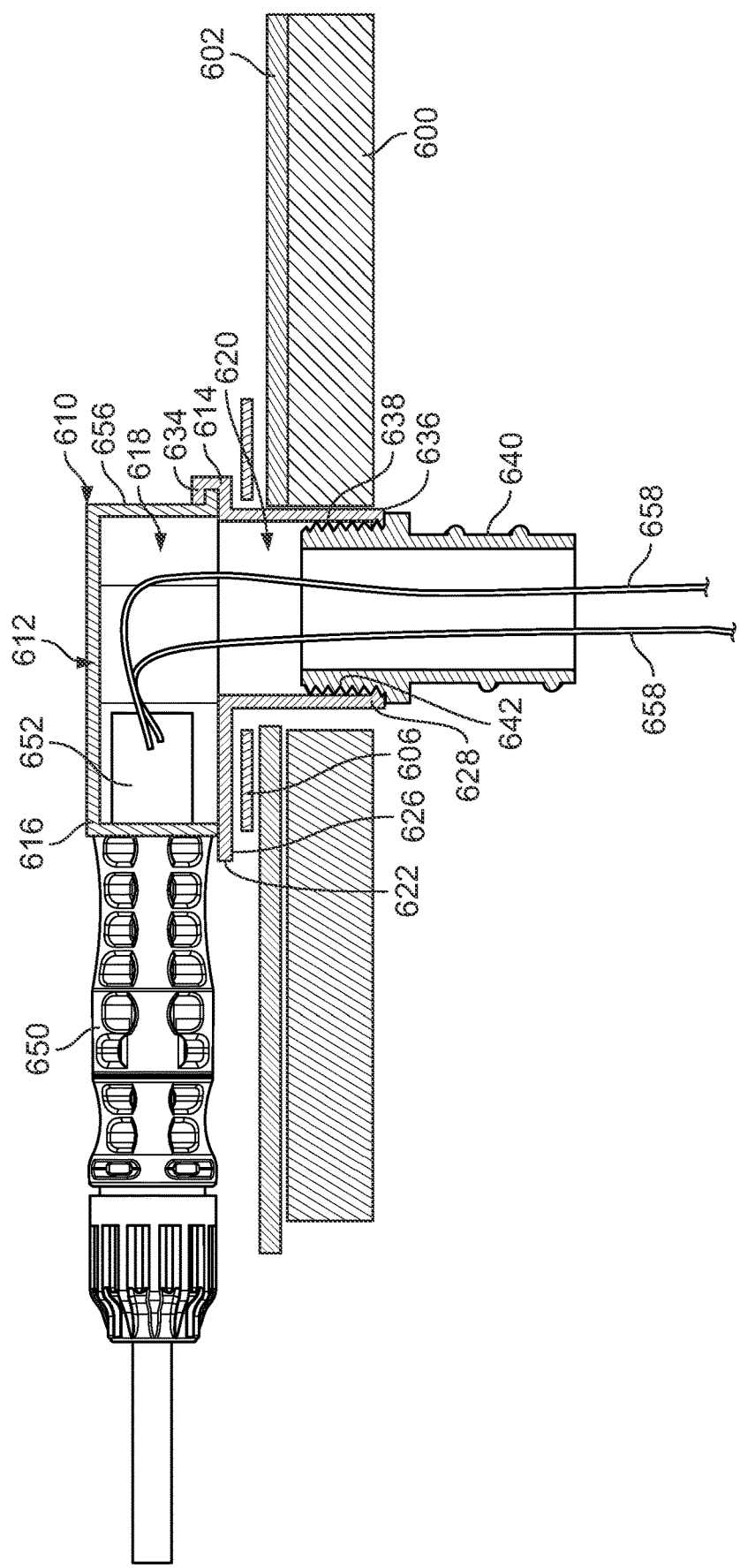
FIG. 23 shows a side cross-sectional view of an electrical cable passthrough including the insert shown in FIGS. 21 and 22.

Referring to FIGS. 21 through 23, in an embodiment, an electrical cable passthrough 610 includes a includes a body portion 612 having a first section 614 and a second section 616 removably connected to the first section 614. In an embodiment, the first section 614 is hollow and includes an interior portion 618. In an embodiment, the second section 616 is hollow and includes an interior portion 620.

In an embodiment, the first section 614 includes a base 622 having a first surface 624 and a second surface 626 opposite the first surface 624, a tubular portion 628 extending from the second surface 626, and an aperture 630 extending from the first surface 624 to the tubular portion 628. In an embodiment, at least one snap tab 632 extends from the first surface 624. In an embodiment, the at least one snap tab 632 includes a plurality of snap tabs 632. In an embodiment, at least one guide tab 634 extends from the first surface 624. In an embodiment, the base 622 includes an oblong shape. In another embodiment, the base 622 includes a circular shape. In another embodiment, the base 622 includes a rectangular shape. In another embodiment, the base 622 includes a square shape. In another embodiment, the base 622 includes a polyagonal shape.

In an embodiment, one end 636 of the tubular portion 628 includes internal threads 638. In an embodiment, the tubular portion 628 is sized and shaped to receive a conduit fitting 640. In an embodiment, external threads 642 of the conduit fitting threadedly engage the internal threads 638 of the tubular portion 628.

In an embodiment, the first section 614 is made from plastic. In an embodiment, the first section 614 is made from polypropylene. In an embodiment, the first section 614 is made from a polymer blend with polypropylene as a base resin. In another embodiment, the first section 614 is made from thermoplastic polyolefin (TPO). In another embodiment, the TPO is a modified TPO including fiberglass and/or other filler material. In another embodiment, the first section 614 is made from metal. In an embodiment, the first section 614 is made of aluminum. In another embodiment, the first section 614 is made of stainless steel.

In an embodiment, the second section 616 includes a sidewall 644 having a first end 646. In an embodiment, the first end 646 of the sidewall 644 includes at least one aperture 648 formed therein. In an embodiment, the at least one aperture 648 is circular in shape. In an embodiment, the at least one aperture 648 is square in shape. In an embodiment, the at least one aperture 648 includes a plurality of the apertures 648. In an embodiment, the at least one aperture 648 is sized and shaped to receive a corresponding one of an at least one electrical connector 650. In an embodiment, one end 652 of the at least one electrical connector 650 is inserted through the at least one aperture 648 and resides within the interior portion 620 of the second section 616. In an embodiment, the at least one electrical connector 650 is a bulkhead (i.e., panel mount) connector. In an embodiment, the at least one electrical connector 650 is electrically connected to jumper modules, jumper cables, or module leads.

In an embodiment, the second section 616 includes at least one slot 654 that is sized and shaped to receive a corresponding one of the at least one tab 632 of the base 622. In an embodiment, an end 656 of the second section 616 is aligned with the guide tab 634 of the base 622 of the first section 614 when the second section 616 is attached to the base 622.

In an embodiment, the electrical cable passthrough 610 is installed on a roof deck 600. In an embodiment, an underlayment layer 602 overlays the roof deck 600. In an embodiment, the electrical cable passthrough 610 is installed on the underlayment layer 602. In an embodiment, a sealant 606 is applied intermediate the underlayment layer 602 and the second section 616 of the electrical cable passthrough 610. In an embodiment, the sealant 606 includes butyl, silicone, rubber, epoxy, latex, neoprene, or polyurethane foam.

In an embodiment, the interior portions 618, 620 are sized and shaped to receive at least one electrical wire 658. In an embodiment, at least one electrical wire 658 is connected to the end 652 of a corresponding one of the at least one electrical connector 650. In an embodiment, the at least one electrical wire 658 extends though the first and second sections 614, 616 and the conduit fitting 640. In an embodiment, the at least one electrical wire 658 is a THHN stranded wire. In an embodiment, the at least one electrical wire 658 is a XHHW stranded wire. In an embodiment, the at least one electrical wire 658 includes a plurality of the electrical wires 658.

The embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
   a roof deck; and
   a passthrough including
      a first section having
         a first edge,
         a first end,
         a second end opposite the first end,
         a first surface extending from the first end to the second end,
         a second surface opposite the first surface, and
         an aperture extending from the first surface to the second surface, and
      a second section attached to the first section,
         wherein the second section includes a first edge substantially aligned with the first edge of the first section, and
         a sidewall extending between the first section and the second section,
      wherein the passthrough is configured to be installed on the roof deck,
      wherein the first surface is juxtaposed with and substantially parallel to the roof deck, and
      wherein the aperture of the first section of the passthrough is configured to align with an aperture formed within the roof deck; and
   at least one cable,
      wherein the aperture of the first section of the passthrough is sized and shaped to receive the at least one cable, and
      wherein the at least one cable extends outwardly from the first edge of the first section and the first edge of the second section of the passthrough.

2. The system of claim 1, wherein the first section includes a second edge opposite the first edge of the first section, and the second section includes a second edge opposite the first edge of the second section, and wherein the second edge of the first section is substantially aligned with the second edge of the second section.

3. The system of claim 1, wherein the second section is removably attached to the first section.

4. The system of claim 1, wherein the passthrough is installed on the roof deck by a plurality of fasteners.

5. The system of claim 1, wherein the passthrough is installed on the roof deck by an adhesive.

6. The system of claim 5, wherein the adhesive is a sealant.

7. The system of claim 6, wherein the sealant located between the first section of the passthrough and the roof deck.

8. The system of claim 7, wherein the sealant is selected from a group consisting of butyl, silicone, rubber, epoxy, latex, neoprene and polyurethane foam.

9. The system of claim 1, wherein the roof deck includes an underlayment layer, wherein the passthrough is configured to be installed on the underlayment layer.

10. The system of claim 1, wherein the sidewall includes at least one aperture, wherein the at least one aperture of the sidewall is sized and shaped to receive a corresponding one of the at least one cable.

11. The system of claim 10, wherein the sidewall includes a first end, wherein the first end of the sidewall is proximate to the first end of the first section, and wherein the at least one aperture of the sidewall is located at the first end of the sidewall.

12. The system of claim 10, wherein the at least one aperture of the sidewall includes a plurality of apertures, and wherein the at least one cable includes a plurality of cables.

13. The system of claim 12, wherein the plurality of apertures is arranged in a linear arrangement.

14. The system of claim 10, wherein the at least one cable includes an electrical connector, wherein the at least one aperture of the sidewall is sized and shaped to receive the electrical connector of the at least one cable.

15. The system of claim 14, wherein the electrical connector is a bulkhead connector.

16. The system of claim 10, wherein the at least one aperture is sealed by a sealant.

17. The system of claim 11, wherein the first section of the passthrough includes a tubular member extending from the first surface, wherein the tubular member includes the aperture of the first section, and wherein the aperture of the roof deck is sized and shaped to receive the tubular member.

18. The system of claim 11, wherein the at least one cable includes THHN stranded wire.

19. The system of claim 11, wherein the at least one cable includes XHHW stranded wire.

20. A cable passthrough, comprising:
   a first section having
      a first edge,
      a first end,
      a second end opposite the first end,
      a first surface extending from the first end to the second end,
      a second surface opposite the first surface, and
      an aperture extending from the first surface to the second surface, and a second section attached to the first section,
         wherein the second section includes a first edge substantially aligned with the first edge of the first section, and
         a sidewall extending between the first section and the second section, wherein the cable passthrough is configured to be installed on a roof deck such that the first surface is juxtaposed with and substantially parallel to the roof deck, and wherein the aperture of the first section is configured to align with an aperture formed within the roof deck, wherein the cable passthrough is configured to receive at least one cable, wherein the aperture of the first section is sized and shaped to receive the at least one cable, and wherein the at least one cable is capable of extending outwardly from the first edge of the first section and the first edge of the second section of the cable passthrough.

* * * * *